(12) United States Patent
Yamatsu et al.

(10) Patent No.: US 7,796,618 B2
(45) Date of Patent: Sep. 14, 2010

(54) COMMUNICATION DEVICE AND COMMUNICATION METHOD USING TOKENS AND LOCAL COUNTERS OF DISCARDED PACKETS TO MAINTAIN ORDER OF THE PACKETS

(75) Inventors: Katsuhiko Yamatsu, Kawasaki (JP); Nobuhiko Eguchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1156 days.

(21) Appl. No.: 11/234,111

(22) Filed: Sep. 26, 2005

(65) Prior Publication Data

US 2006/0013241 A1    Jan. 19, 2006

Related U.S. Application Data

(63) Continuation of application No. PCT/JP03/04057, filed on Mar. 31, 2003.

(51) Int. Cl.
*H04L 12/56* (2006.01)
(52) U.S. Cl. .............. 370/401; 370/412; 370/428; 709/249; 710/53
(58) Field of Classification Search ............. 370/401, 370/412; 709/201
See application file for complete search history.

(56) References Cited

U.S. PATENT DOCUMENTS 5,361,372 A * 11/1994 Rege et al. ............ 709/234
6,049,818 A * 4/2000 Leijten et al. ............ 718/107
6,678,248 B1 * 1/2004 Haddock et al. ............ 370/235
6,772,244 B2 * 8/2004 Nguyen et al. ............ 710/58
6,925,055 B1 * 8/2005 Erimli et al. ............ 370/229
2002/0107903 A1 * 8/2002 Richter et al. ............ 709/201
2002/0122424 A1   9/2002 Kawarai et al.

FOREIGN PATENT DOCUMENTS

| EP | 0 933 949 | 8/1999 |
|---|---|---|
| JP | 9-162927 | 6/1997 |
| JP | 11-234331 | 8/1999 |
| JP | 11-317768 | 11/1999 |
| JP | 2002-261826 | 9/2002 |

* cited by examiner

*Primary Examiner*—Chirag G Shah
*Assistant Examiner*—Salvador E Rivas
(74) *Attorney, Agent, or Firm*—Staas & Halsey LLP

(57) ABSTRACT

A communication device having a plurality of processor units is disclosed. Each processor unit has a buffer for buffering packets, a receiving processor, and a transmitting processor. Upon receipt of a reception token, the receiving processor receives packets from the outside. Then, if the buffer is empty, the receiving processor buffers the received packets in the buffer. If the buffer is not empty, the receiving processor discards the received packets, increments the number of discarded packets, and passes the reception token to another processor unit for circulation. Upon receipt of a transmission token, the transmitting processor transmits the packets in the buffer to the outside based on the number of discarded packets.

10 Claims, 20 Drawing Sheets

F I G. 1
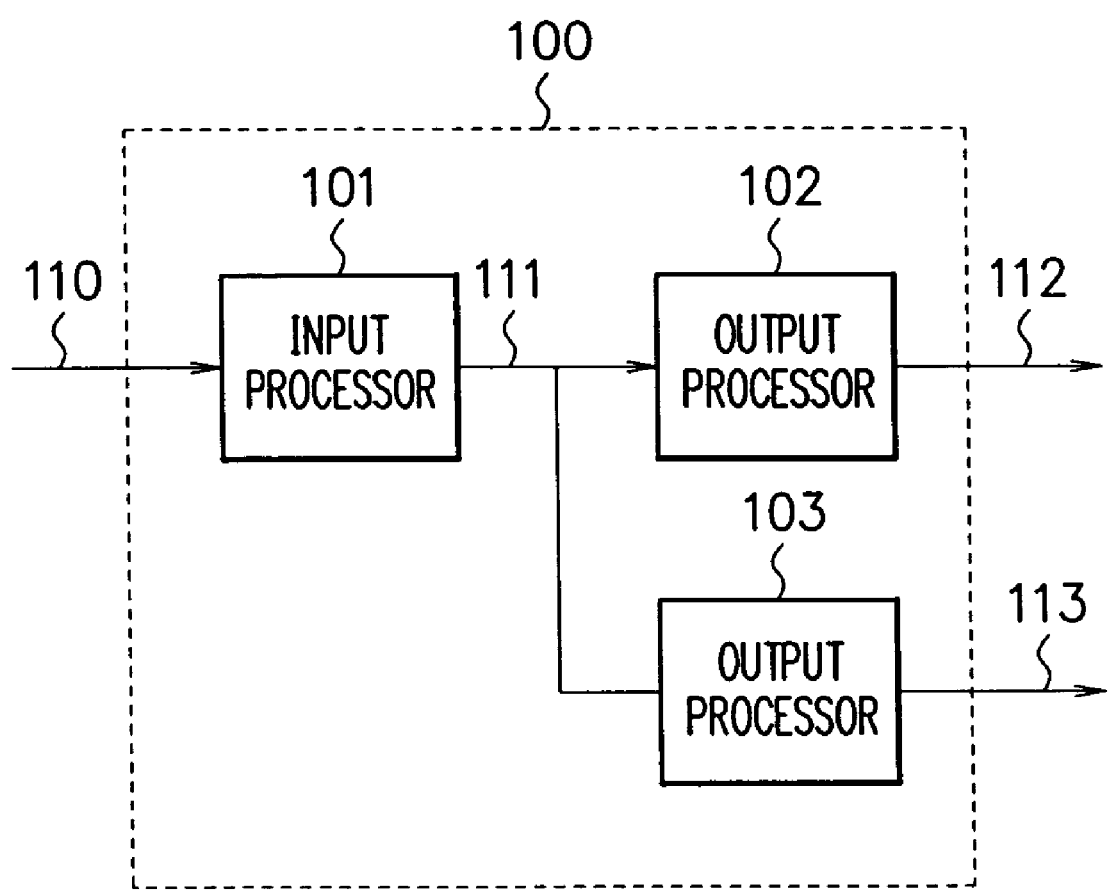

F I G. 14
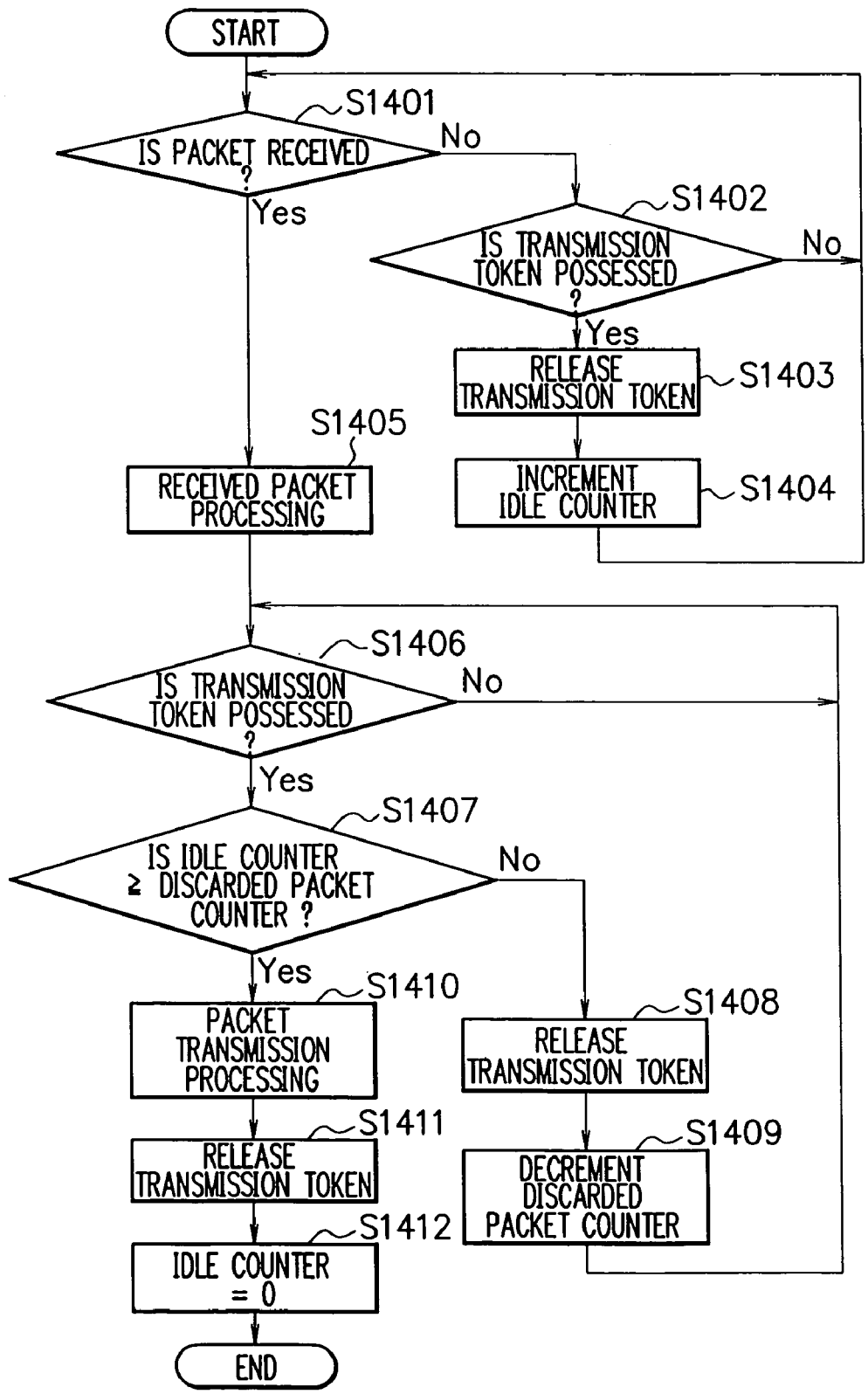

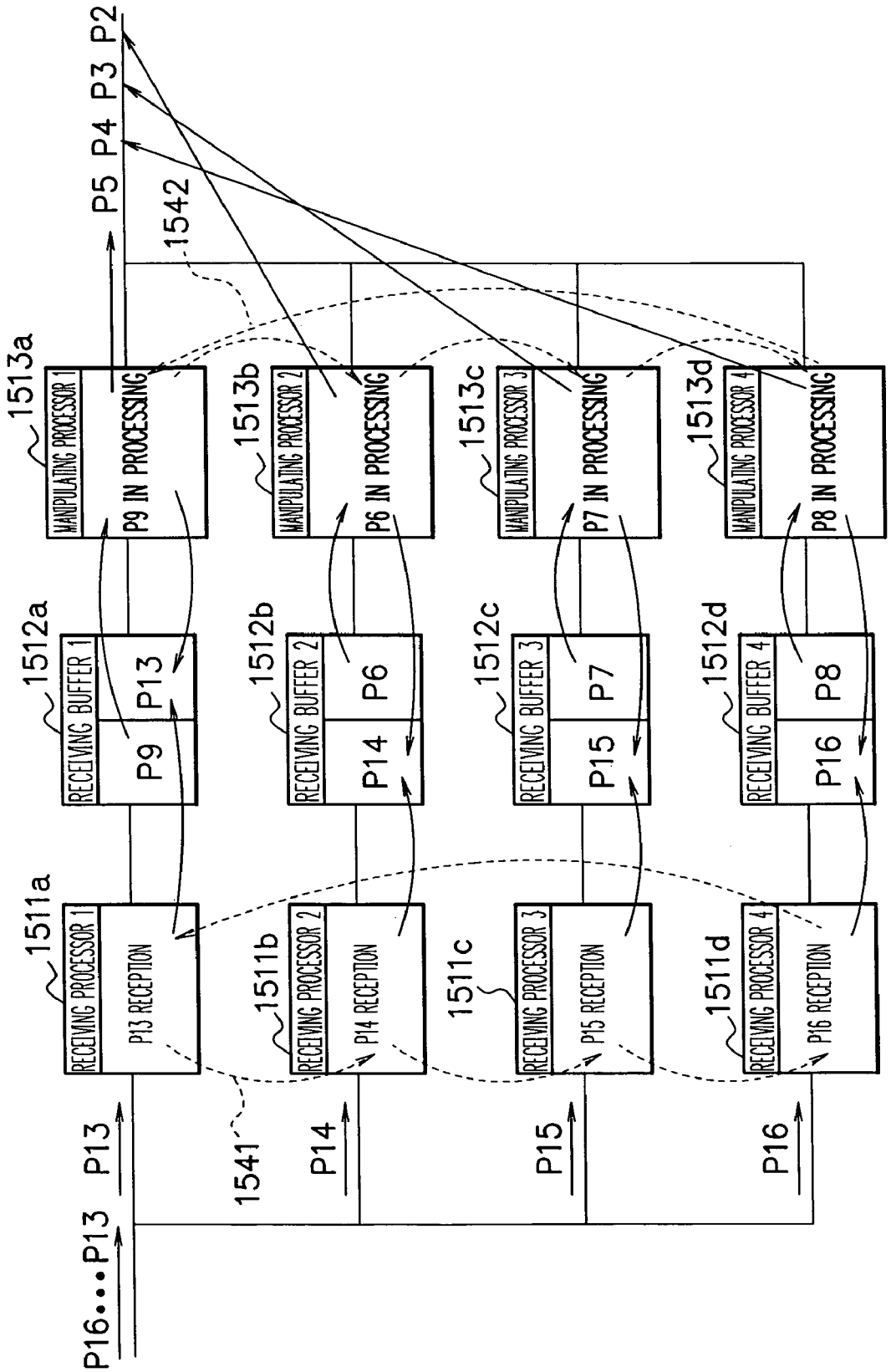

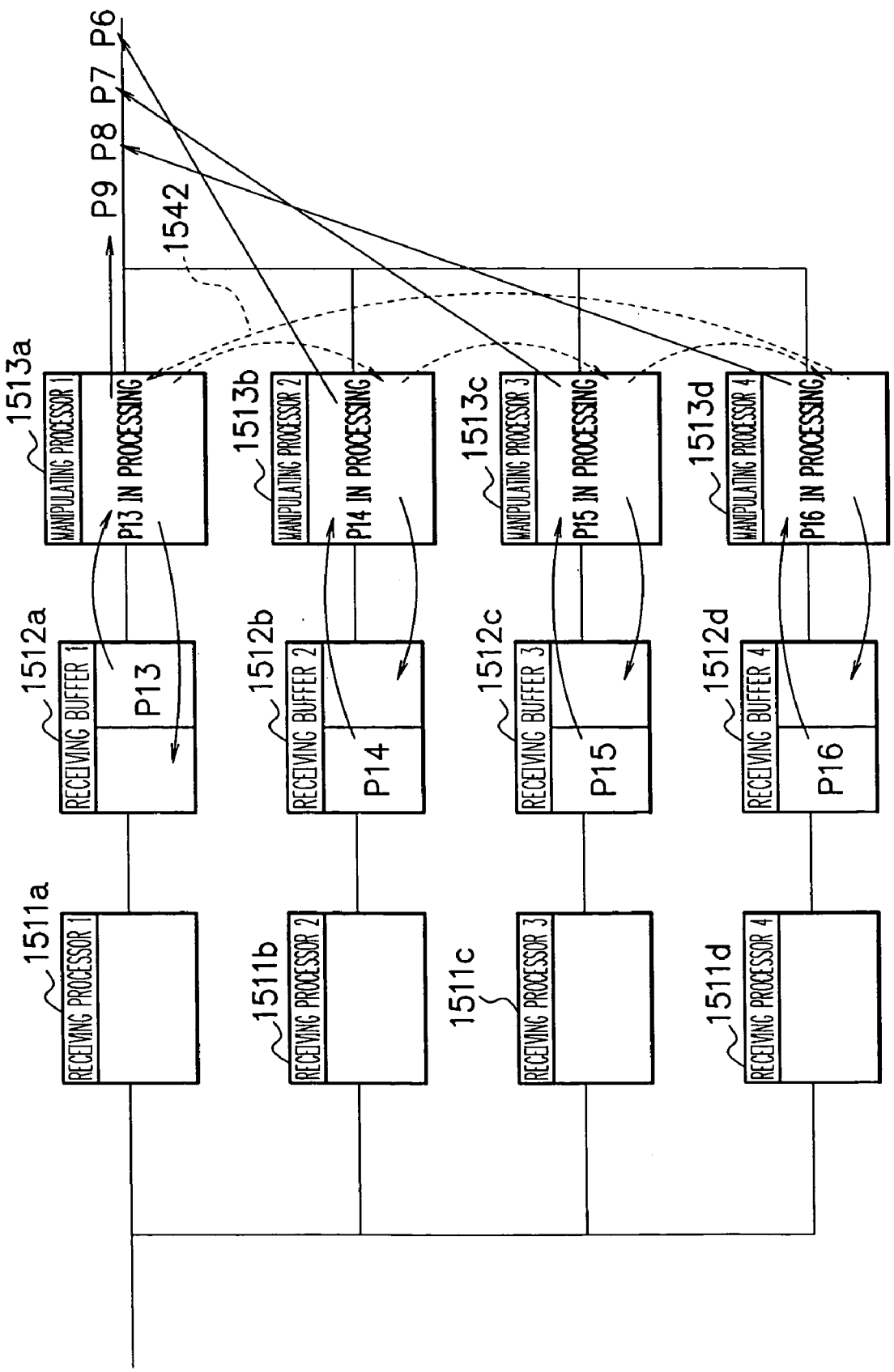

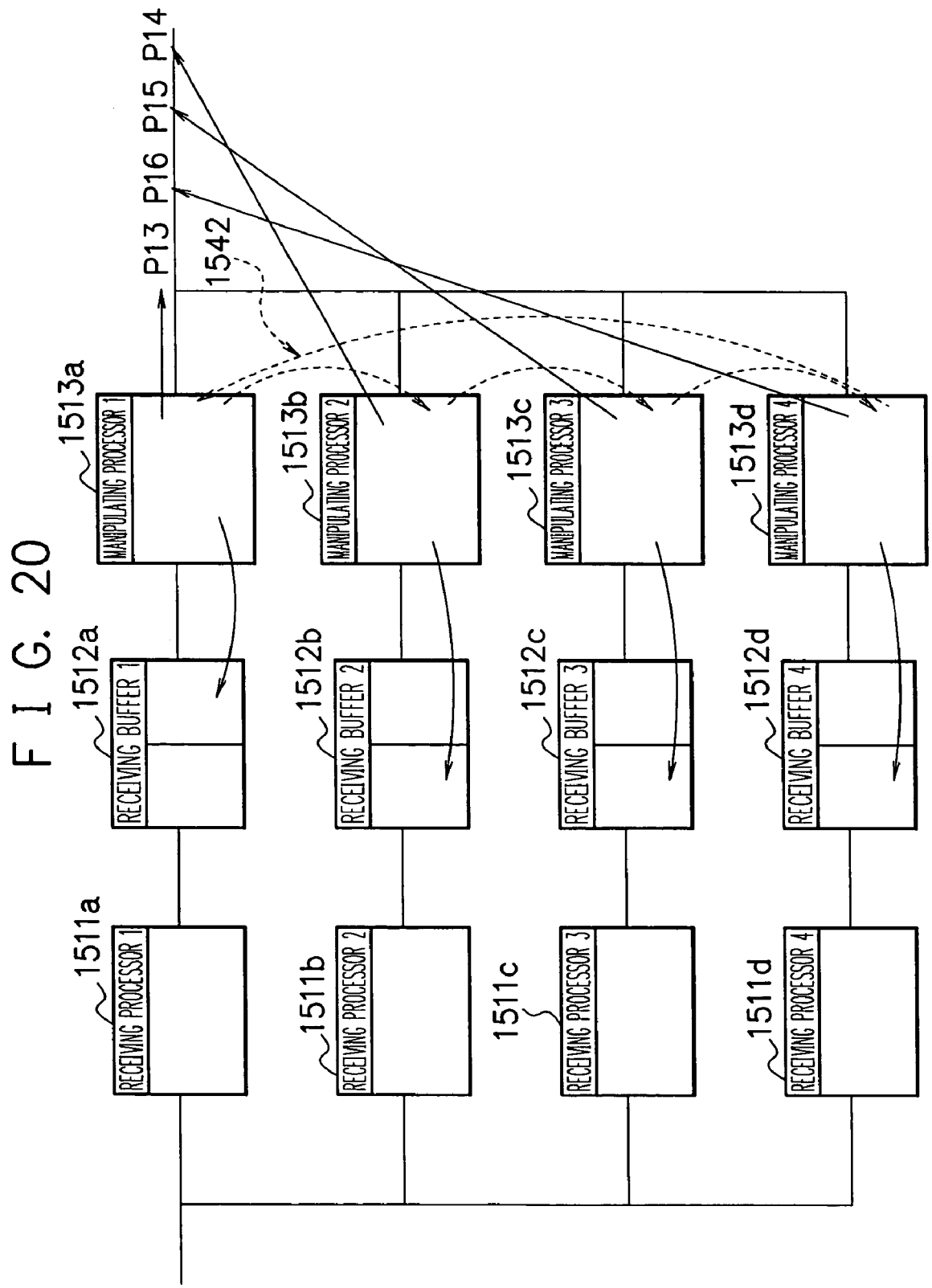

COMMUNICATION DEVICE AND COMMUNICATION METHOD USING TOKENS AND LOCAL COUNTERS OF DISCARDED PACKETS TO MAINTAIN ORDER OF THE PACKETS

CROSS-REFERENCE TO RELATED APPLICATIONS

This application is a continuation of PCT International Application No. PCT/JP2003/004057, filed on Mar. 31, 2003, the entire contents of which are incorporated herein by reference.

TECHNICAL FIELD

The present invention relates to a communication technique and, more particularly, to a technique in which a plurality of processor units communicate packets using a token.

BACKGROUND ART

In order to perform processing to high-speed packets (Gigabit Ether etc.), an attempt is made to increase the processing speed by using a plurality of processors for parallel processing. Moreover, load dispersion, higher-speed processing, and packet order matching among the plurality of processors are realized by using a token among the plurality of processors.

FIG. 15 shows a communication device of a multi-processor system according to a conventional technique. In the communication device, first to fourth processor units 1501 to 1504 are connected in parallel and a packet 1531 is inputted and a packet 1532 is outputted. The first processor unit 1501 comprises a first receiving processor 1511a, a first receiving buffer 1512a, and a first manipulating processor 1513a. The second processor unit 1502 comprises a second receiving processor 1511b, a second receiving buffer 1512b, and a second manipulating processor 1513b. The third processor unit 1503 comprises a third receiving processor 1511c, a third receiving buffer 1512c, and a third manipulating processor 1513c. The fourth processor unit 1504 comprises a fourth receiving processor 1511d, a fourth receiving buffer 1512d, and a fourth manipulating processor 1513d.

Hereinafter, the individual or all of the first to fourth receiving processors 1511a to 1511d are referred to as a receiving processor 1511, the individual or all of the first to fourth receiving buffers 1512a to 1512d are referred to as a receiving buffer 1512, and the individual or all of the first to fourth manipulating processors 1513a to 1513d are referred to as a manipulating processor 1513.

The main function of the receiving processor 1511 is to receive packets. The main function of the manipulating processor 1513 is to manipulate the received packets and to transmit packets. The receiving buffer 1512 has an interface function between the receiving processor 1511 and the manipulating process 1513, and has a buffering capacity, for example, for two packets.

A reception token 1541 and a transmission token 1542 circulate through the processor units 1501 to 1504 asynchronously. Upon receipt of the reception token 1541, the receiving processor 1511 receives the reception packet 1531 and passes the reception token 1541 to the next process unit. Upon receipt of the transmission token 1542, the manipulating processor 1513 transmits the transmission packet 1532 and passes the transmission token 1542 to the next processor unit.

In the flow of the operation, when the packet 1531 is inputted, the receiving processor 1511 having the reception token 1541 receives the packet 1531 and the received packet is stored in the receiving buffer 1512. When learning that the packet is stored in the receiving buffer 1512, the manipulating processor 1513 starts to perform processing to the packet and, if having the transmission token 1542, transmits the packet and releases the receiving buffer 1512 when the processing is completed.

The flow described above is an ideal flow of processing but the above-mentioned processing is not necessarily performed because of the recent trend toward higher-speed communication and toward more complex incorporated functions. When a packet is inputted, the receiving buffer 1512 tries to receive the packet but, if an over-load is imposed such that the receiving buffer 1512 is not released before the packet is inputted because the manipulating processor 1513 is in a congestion state, the packet cannot be received. In other words, the packet is discarded as a result.

In a network processor etc., the manipulating processor 1513 is programmable and it is possible for a programmer to create an arbitrary program. As the scale of this program becomes larger, the processing time becomes longer, the release of the receiving buffer 1512 is delayed and the number of packets to be discarded increases. Due to the occurrence of the packet to be discarded, the order of the packets is reversed, which cannot be resolved by the packet order matching by a token. The operation at this time is shown below.

As shown in FIG. 16, when packets P1 to P8 are inputted successively, first, the first receiving processor 1511a having the reception token 1541 receives the packet P1, stores the packet in the first receiving buffer 1512a, and passes the reception token 1541 to the second receiving processor 1511b. Next, the receiving processor 1511b having the reception token 1541 receives the packet P2, stores the packet in the receiving buffer 1512b, and passes the reception token 1541 to the third receiving processor 1511c. After this, the reception token 1541 is circulated through the third receiving processor 1511c→the fourth receiving processor 1511d→the first receiving processor 1511a . . . , and thus the packets are received.

Due to this, the first receiving buffer 1512a stores the packets P1 and P5, the second receiving buffer 1512b stores the packets P2 and P6, the third receiving buffer 1512c stores the packets P3 and P7, and the fourth receiving buffer 1512d stores the packets P4 and P8. The first manipulating processor 1513a performs processing to the packet P1 in the first receiving buffer 1512a, the second manipulating processor 1513b performs processing to the packet P2 in the second receiving buffer 1512b, the third manipulating processor 1513c performs processing to the packet P3 in the third receiving buffer 1512c, and the fourth manipulating processor 1513d performs processing to the packet P4 in the fourth receiving buffer 1512d.

Next, as shown in FIG. 17, since having the transmission token 1542, the first manipulating processor 1513a transmits the processed packet P1 and releases the packet P1 in the first receiving buffer 1512a. After this, the first manipulating processor 1513a passes the transmission token 1542 to the second manipulating processor 1513b and performs processing to the packet P5 in the first receiving buffer 1512a.

After this, when packets P9 to P12 are inputted successively, the first receiving processor 1511a having the reception token 1541 receives the packet P9, stores the packet in the first receiving buffer 1512a, and passes the reception token 1541 to the second receiving processor 1511b. Next, the second receiving processor 1511b having the reception token 1541 receives the packet 10, but discards the packet P10 because the receiving buffer 1512b is full and passes the reception token 1541 to the third receiving processor 1511c. Similarly, the third and fourth receiving processors 1511c and 1511d discard the packets P11 and P12 because the receiving buffers 1512c and 1512d are full.

Next, as shown in FIG. 18, since having the transmission token 1542, the second manipulating processor 1513b transmits the processed packet P2 and releases the packet P2 in the second receiving buffer 1512b. After this, the second manipulating processor 1513b passes the transmission token 1542 to the third manipulating processor 1513c and performs processing to the packet P6 in the second receiving buffer 1512b. Similarly, the third and fourth manipulating processors 1513c and 1513d transmit the packet P3 and P4, respectively, and then perform processing to the packets P7 and P8. Next, the first manipulating processor 1513a transmits the packet P5 and then performs processing to the packet P9.

Next, when packets P13 to P16 are inputted successively, the first receiving processor 1511a having the reception token 1511 receives the packet P13, stores the packet in the first receiving buffer 1512a, and passes the reception token 1541 to the second receiving processor 1511b. Similarly, the second to fourth receiving processors 1511b to 1511d receive the packets P14 to P16, respectively, and store the packets in the receiving buffers 1512b to 1512d.

Next, as shown in FIG. 19, since having the transmission token 1542, the second manipulating processor 1513b transmits the processed packet P6 and releases the packet P6 in the second receiving buffer 1512b. After this, the second manipulating processor 1513b performs processing to the packet P14 in the second receiving buffer 1512b. Similarly, the third and fourth manipulating processors 1513c and 1513d transmit the packets P7 and P8, respectively, and then perform processing to the packets P15 and P16. Next, the first manipulating processor 1513a transmits the packet P9 and then performs processing to the packet P13.

Next, as shown in FIG. 20, since having the transmission token 1542, the second manipulating processor 1513b transmits the processed packet P14 and releases the packet P14 in the second receiving buffer 1512b. Next, similarly, the third and fourth manipulating processors 1513c and 1513d transmit the packets P15 and P16, respectively. Next, the first manipulating processor 1513a transmits the packet P13.

As described above, the transmission token 1542 circulates and transmission is performed in the order of the first manipulating processor→the second manipulating processor→the third manipulating processor→the fourth manipulating processor→the first manipulating processor→ . . . . Since the packet itself does not have a number of identifying the input order, each manipulating processor 1513 cannot learn what number packet is that stored in the receiving buffer 1512 and processing is performed simply in order of storage in the receiving buffer 1512. Therefore, if the packets P10 to P12 are discarded, a problem arises in that the order of transmission of the packet P13 is reversed. That is, the order of the packets is P14→P15→P16→P13. In this case also, it is preferable for the packet P13 to be transmitted in the proper order.

If a packet is transmitted in reversed order, the packet cannot be received by a proper destination, resulting in an increase in unwanted traffic caused by its recovery. It is necessary to keep the influence on the processing performance of a processor to a minimum, therefore, it is required for a method for preventing the order of packets from being reversed to be simplified as much as possible.

Moreover, the following Patent document 1 is disclosed.

[Patent Document 1]

Japanese Patent Application Laid-Open No. Hei 9-162927

SUMMARY OF THE INVENTION

An object of the present invention is to provide a communication technique capable of preventing the order of packet transmission from being reversed with a simplified configuration.

According to an aspect of the present invention, a communication device is provided that comprises a plurality of processor units, wherein each processor unit has a buffer for buffering packets, a receiving processor and a transmitting processor. Upon receipt of a reception token, the receiving processor receives a packet from the outside, buffers the received packet in the buffer, and passes the reception token to another processor unit for circulation. Upon receipt of a transmission token, the transmitting processor transmits the packet in the buffer to the outside and passes the transmission token to another processor unit for circulation. Upon receipt of the reception token, the receiving processor buffers the received packet in the buffer when the buffer is empty, or discards the received packet and increments the number of discarded packets when the buffer is not empty and passes the reception token to another processor unit. The transmission processor transmits the packets to the outside in the order of reception of the packets based on the counted number of discarded packets.

According to the present invention, each processor unit counts the number of discarded packets and transmits the packets based on the number of discarded packets, therefore, it is possible to prevent the order of packet transmission from being reversed even when the received packets are discarded because of the state of congestion. Moreover, there is no need to take the state or the like of other processor units into consideration and the order of packet transmission can be prevented form being reversed with a simple configuration and the influence on the processing performance of the communication device can be kept to a minimum.

BRIEF DESCRIPTION OF THE DRAWINGS

FIG. 1 is a block diagram showing a configuration example of a router, which is a communication device in an embodiment of the present invention;

FIG. 14 is a flowchart showing the processing procedure of an input processor;

FIG. 18 is a diagram showing the processing example of the input processor according to the conventional technique;

FIG. 19 is a diagram showing the processing example of the input processor according to the conventional technique; and FIG. 20 is a diagram showing the processing example of the input processor according to the conventional technique.

DETAILED DESCRIPTION OF THE PREFERRED EMBODIMENTS

Figure 2:
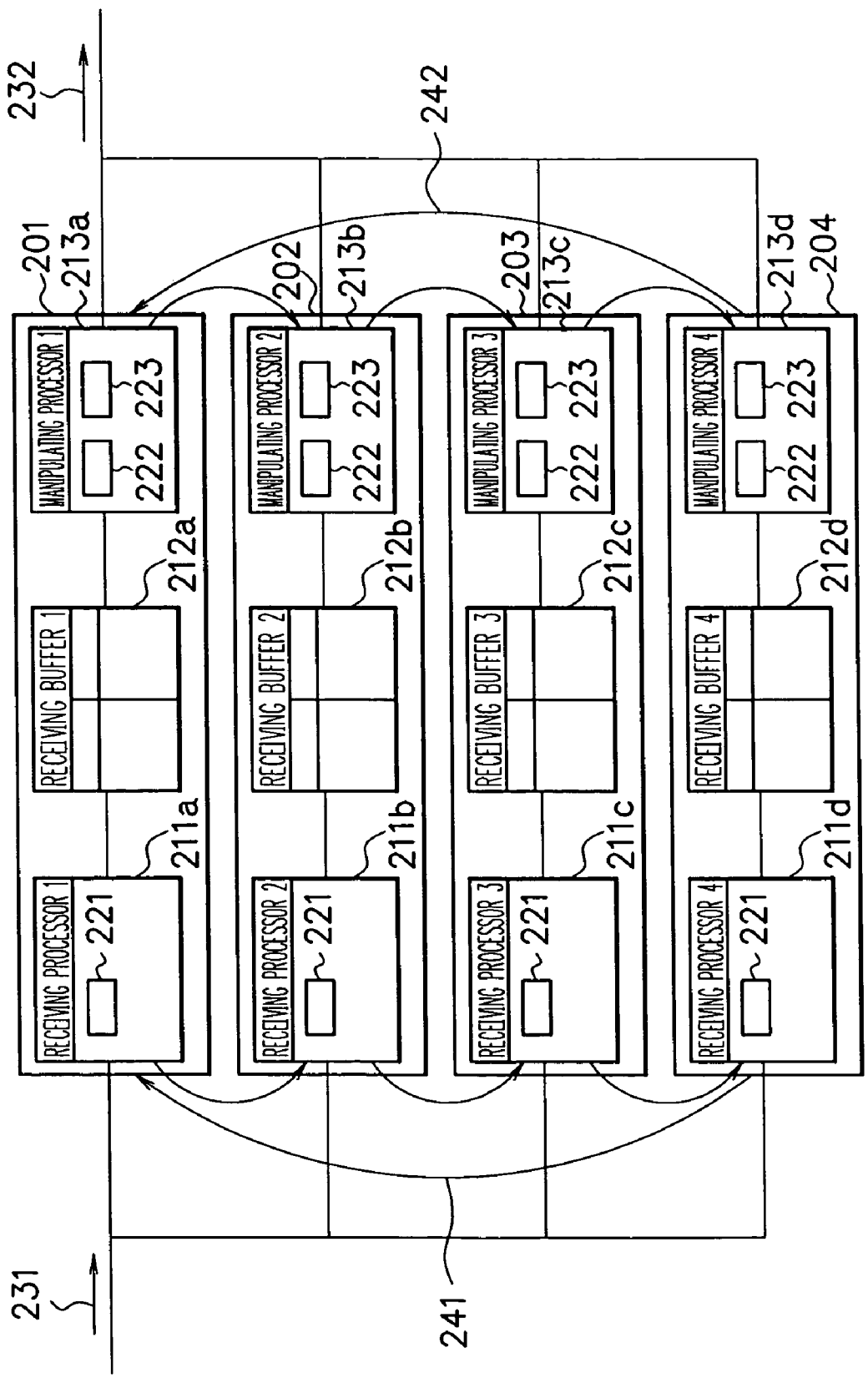
FIG. 2 is a diagram showing a configuration example of an input processor in the present embodiment.

FIG. 1 is a configuration example of a router, which is a communication device according to an embodiment of the present invention. A router 100 comprises, for example, an input processor 101 and output processors 102 and 103. The input processor 101, to which packets 110 having a MAC (media access control) frame are inputted, analyzes the address of the packets, and outputs packets 111 in proper order. The output processors 102 and 103 receive the packets 111 transmitted from the input processor 101, respectively, and output packets 112 and 113 in accordance with the above-mentioned analyzed address. In other words, in order to transmit the packet to the proper destination in accordance with the address, the packet 112 is outputted to a first port or the packet 113 is outputted to a second port. The packets 112 and 113 are packets having the MAC frame. In this way, the router 100 controls the output destination of a packet in accordance with its address.

FIG. 2 shows a configuration example of the above-mentioned input processor (communication device) 101. The input processor comprises first to fourth processor units 201 to 204 connected in parallel, wherein a packet 231 is inputted and a packet 232 is outputted. The first processor unit 201 comprises a first receiving processor 211a, a first receiving buffer 212a, and a first manipulating processor 213a. The second processor unit 202 comprises a second receiving processor 211b, a second receiving buffer 212b, and a second manipulating processor 213b. The third processor unit 203 comprises a third receiving processor 211c, a third receiving buffer 212c, and a third manipulating processor 213c. The fourth processor unit 204 comprises a fourth receiving processor 211d, a fourth receiving buffer 212d, and a fourth manipulating processor 213d.

Hereinafter, the individual or all of the first to fourth receiving processors 211a to 211d are referred to as a receiving processor 211, the individual or all of the first to fourth receiving buffers 212a to 212d are referred to as a receiving buffer 212, and the individual or all of the first to fourth manipulating processors 213a to 213d are referred to as a manipulating processor (transmitting processor) 213.

Further, the receiving processor 211 has a discarded packet counter 221. The manipulating processor 213 has an idle counter 222 and a discarded packet counter 223.

The main function of the receiving processor 211 is to receive packets. The main function of the manipulating processor 213 is to perform processing to received packets and to transmit packets. The receiving buffer 212 has an interface function between the receiving processor 211 and the manipulating process 213 and, for example, has a buffering capacity for two packets.

A reception token 241 and a transmission token 242 circulate through the processor units 201 to 204 asynchronously. Upon receipt of the reception token 241, the receiving processor 211 receives a reception packet 231 and passes the reception token 241 to the next processor unit. Upon receipt of the transmission token 242, the manipulating processor 213 transmits a transmission packet 232 and passes the transmission token 242 to the next processor unit.

When the packet 231 is inputted, the receiving processor 211 having the reception token 241 receives the packet 231 and the received packet is stored in the receiving buffer 212. When learning that the packet is stored in the receiving buffer 212, the manipulating processor 213 starts to perform processing to the packet and, if having the transmission token 242, transmits the packet and releases the receiving buffer 212 when the processing is completed.

Figure 3:
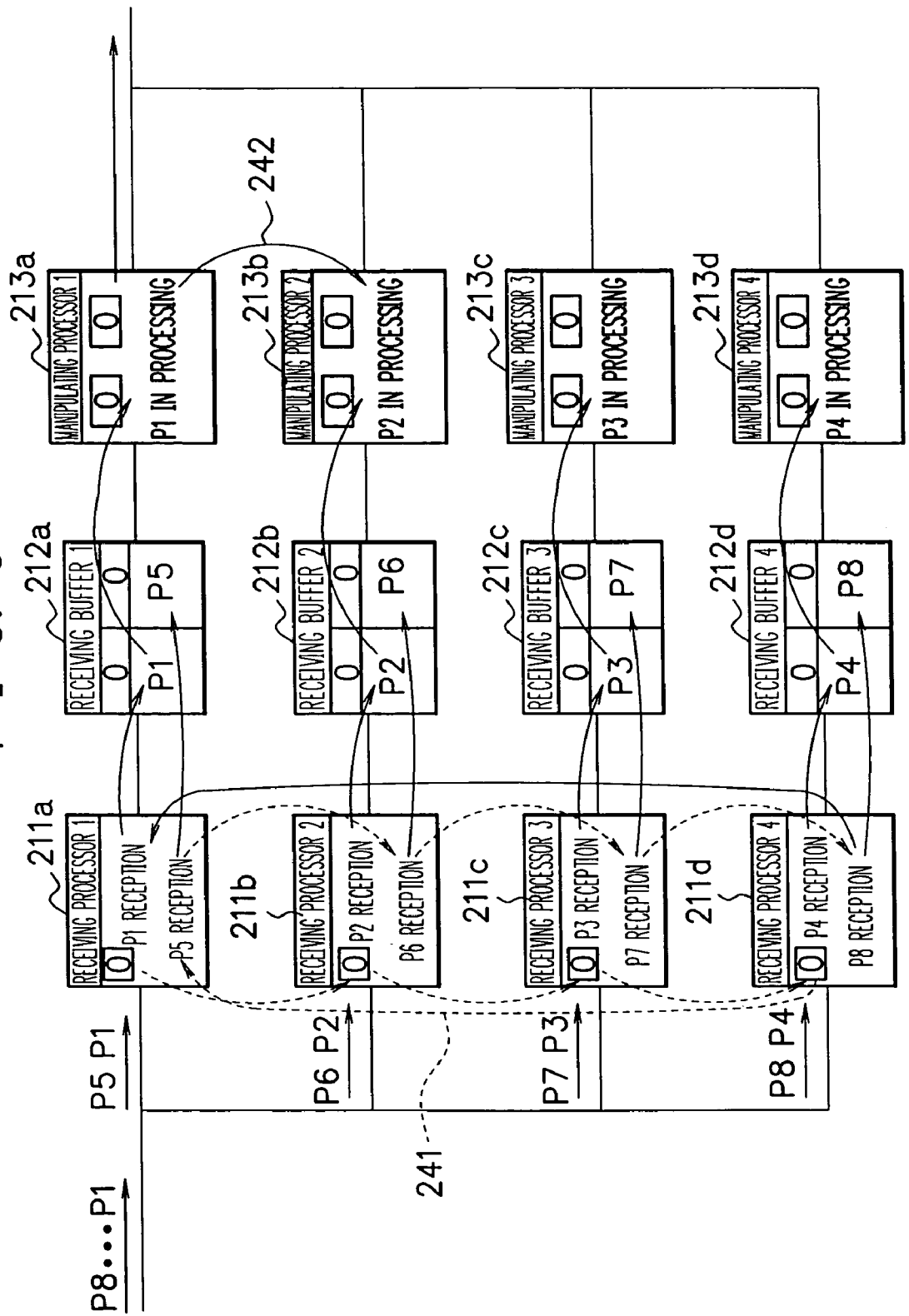
FIG. 3 is a diagram showing a first processing example of an input processor.

As shown in FIG. 3, when packets P1 to P8 are inputted successively, first, the first receiving processor 211a having the reception token 241 receives the packet P1, stores the packet in the first receiving buffer 212a, and passes the reception token 241 to the second receiving processor 211b. Next, the receiving processor 211b having the reception token 241 receives the packet P2, stores the packet in the receiving buffer 212b, and passes the reception token 241 to the third receiving processor 211c. Next, similarly, the third and fourth receiving processors 211c and 211d receive the packets P3 and P4, respectively, and store the packets in the receiving buffers 212c and 212d. The reception token 241 is circulated through the third receiving processor 211c→the fourth receiving processor 211d→the first receiving processor 211a .... Next, the first to fourth receiving processors 211a to 211d receive the packets P5 to P8, respectively, and store the packets in the receiving buffers 211a to 212d.

The first receiving buffer 212a stores the packets P1 and P5, the second receiving buffer 212b stores the packets P2 and P6, the third receiving buffer 212c stores the packets P3 and P7, and the fourth receiving buffer 212d stores the packets P4 and P8. The first manipulating processor 213a performs processing to the packet P1 in the first receiving buffer 212a, the second manipulating processor 213b performs processing to the packet P2 in the second receiving buffer 212b, the third manipulating processor 213c performs processing to the packet P3 in the third receiving buffer 212c, and the fourth manipulating processor 213d performs processing to the packet P4 in the fourth receiving buffer 212d.

Figure 4:
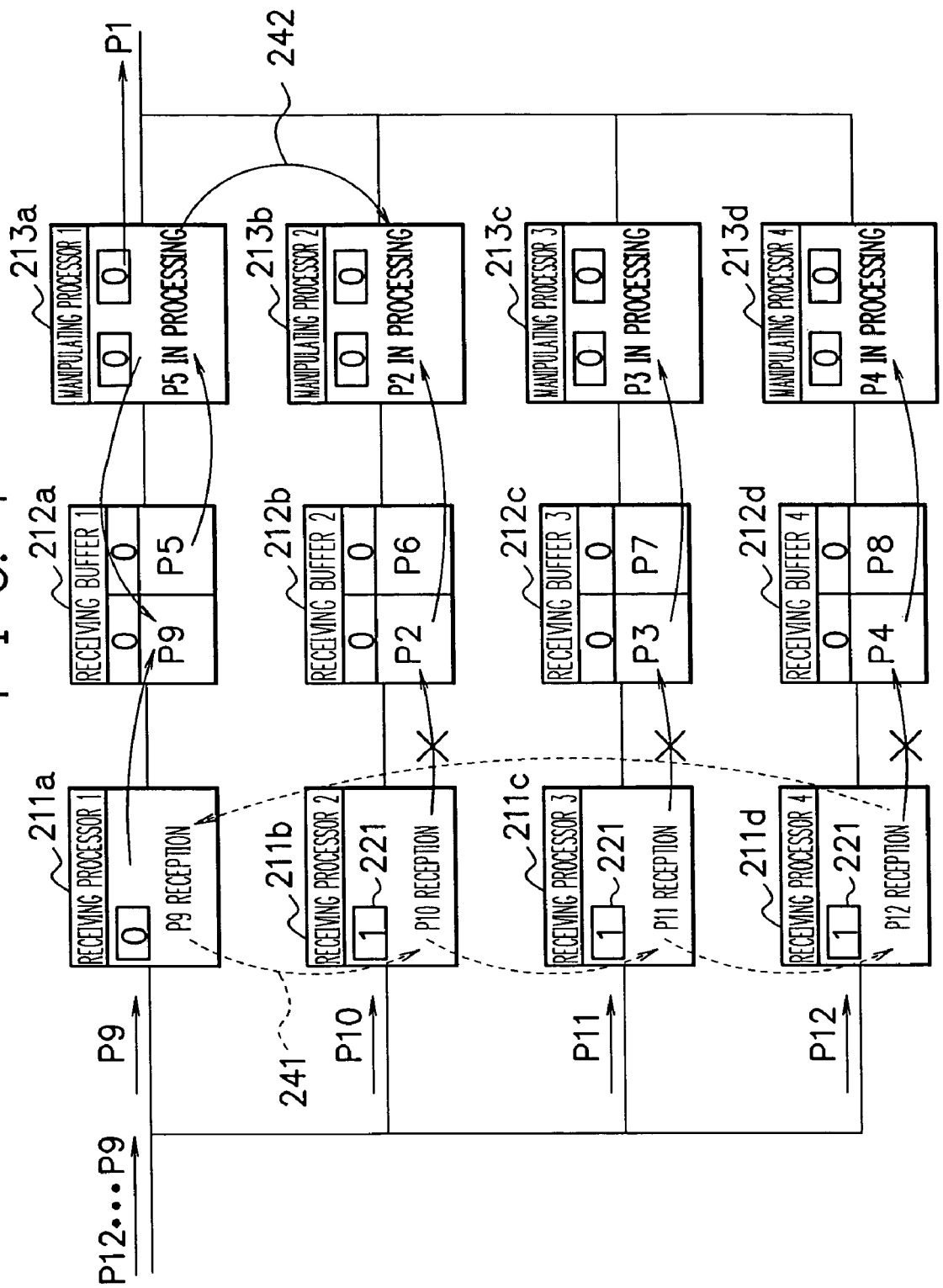
FIG. 4 is a diagram showing the first processing example of the input processor.

Next, as shown in FIG. 4, since having the transmission token 242, the first manipulating processor 213a transmits the processed packet P1 and releases the packet P1 in the first receiving buffer 212a. After this, the first manipulating processor 213a passes the transmission token 242 to the second manipulating processor 213c and performs processing to the packet P5 in the first receiving buffer 212a.

After this, when packets P9 to P12 are inputted successively, the first receiving processor 211a having the reception token 241 receives the packet P9, stores the packet in the first receiving buffer 212a, and passes the reception token 241 to the second receiving processor 211b. Next, the second receiving processor 211b having the reception token 241 receives the packet 10, but discards the packet P10 and increments the discarded packet counter 221 (+1) because the receiving buffer 212b is full and passes the reception token 241 to the third receiving processor 211c. Similarly, the third and fourth receiving processors 211c and 211d discard the packets P11 and P12 and increment the discarded packet counter 221 because the receiving buffers 212c and 212d are full. The value of the discarded packet counter 221 of the second to fourth receiving processors 211b to 211d becomes "1".

Figure 5:
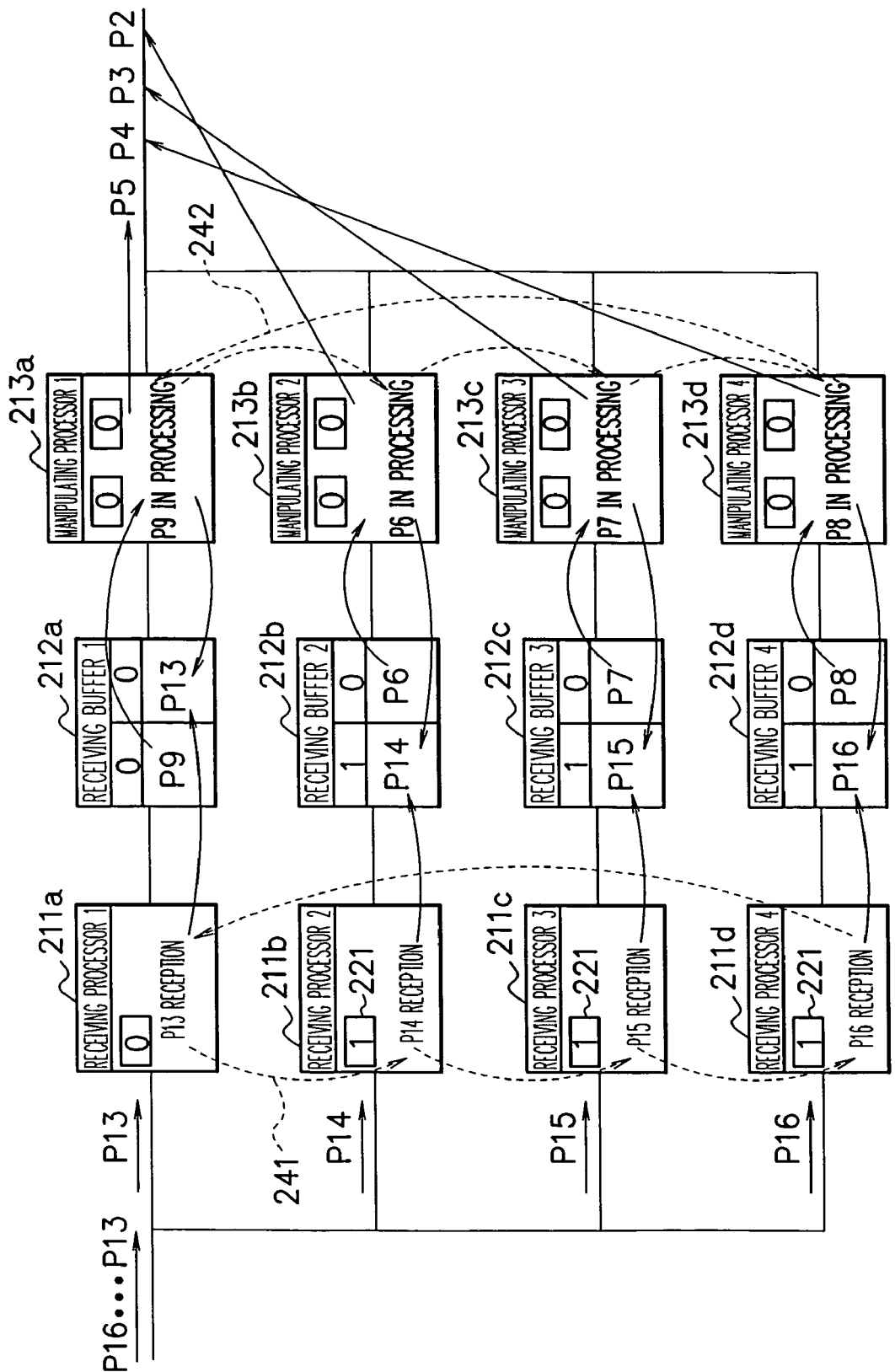
FIG. 5 is a diagram showing the first processing example of the input processor.

Next, as shown in FIG. 5, since having the transmission token 242, the second manipulating processor 213b transmits the processed packet P2 and releases the packet P2 in the second receiving buffer 212b. After this, the second manipulating processor 213b passes the transmission token 242 to the third manipulating processor 213c and performs processing to the packet P6 in the second receiving buffer 212b. Similarly, the third and fourth manipulating processors 213c and 213d transmit the packets P3 and P4, respectively, and then perform processing to the packets P7 and P8. Next, the first manipulating processor 213a transmits the packet P5 and then performs processing to the packet P9.

Next, when packets P13 to P16 are inputted successively, the first receiving processor 211a having the reception token 241 receives the packet P13, stores the packet in the first receiving buffer 212a, and passes the reception token 241 to the second receiving processor 211b. Similarly, the second to fourth receiving processors 211b to 211d receive the packets P14 to P16, respectively, and store the packets in the receiving buffers 212b to 212d. The second to fourth receiving buffers 212b to 212d store the value of "1" of the discarded packet counter 221 of the second to fourth receiving processors 211b to 211d as well as storing the packets P14 to P16.

Figure 6:
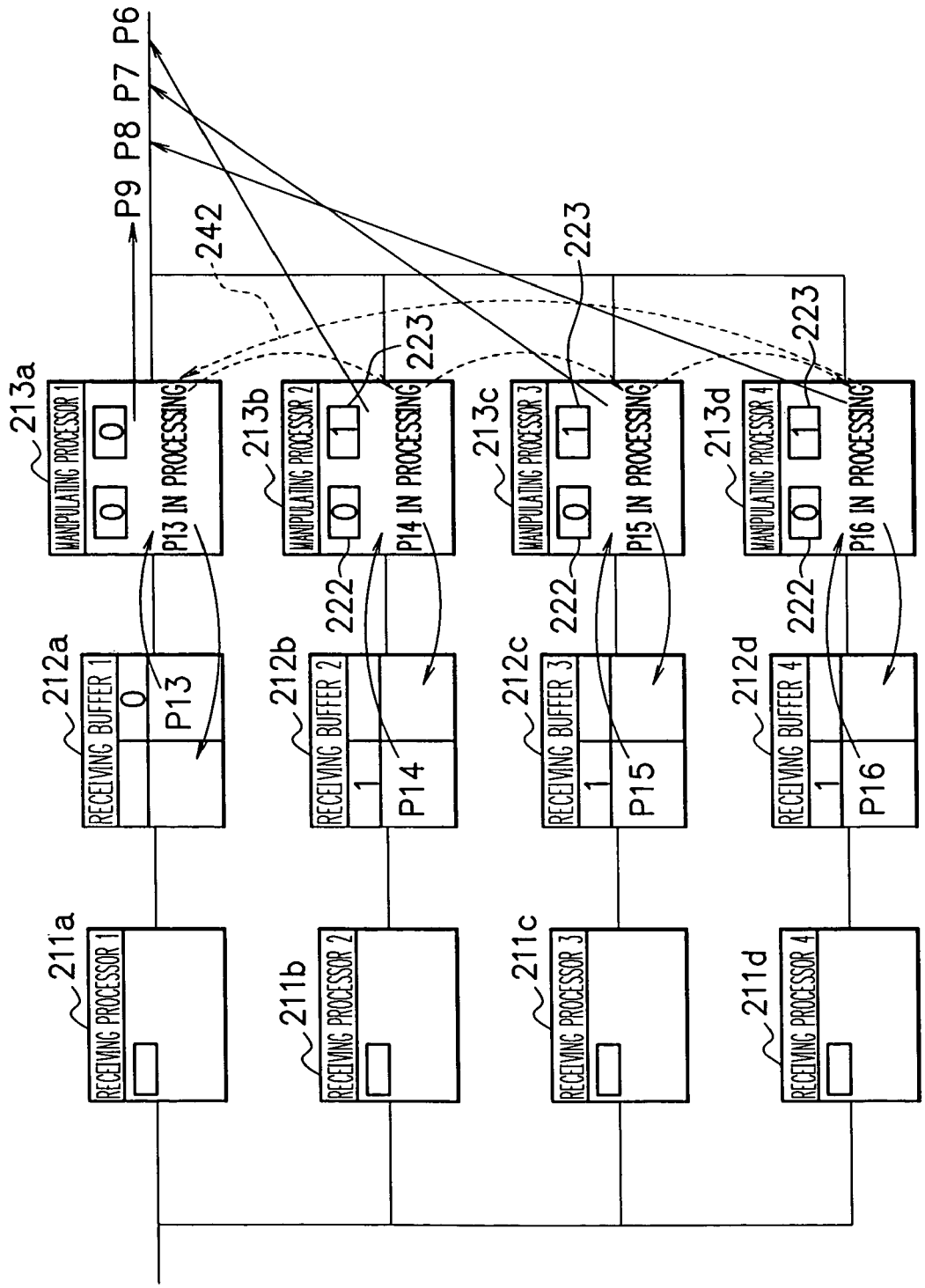
FIG. 6 is a diagram showing the first processing example of the input processor.

Next, as shown in FIG. 6, since having the transmission token 242, the second manipulating processor 213b transmits the processed packet P6 and releases the packet P6 in the second receiving buffer 212b. After this, the second manipulating processor 213b performs processing to the packet P14 in the second receiving buffer 212b and at the same time, sets the discarded packet counter value "1" in the receiving buffer 212b to the discarded packet counter 223. Similarly, the third and fourth manipulating processors 213c and 213d transmit the packets P7 and P8, respectively, and then perform processing to the packets P15 and P16 and at the same time, set the discarded packet counter value "1" in the receiving buffers 212c and 212d to the discarded packet counters 223. Next, the first manipulating processor 213a transmits the packet P9 and then performs processing to the packet P13.

Figure 7:
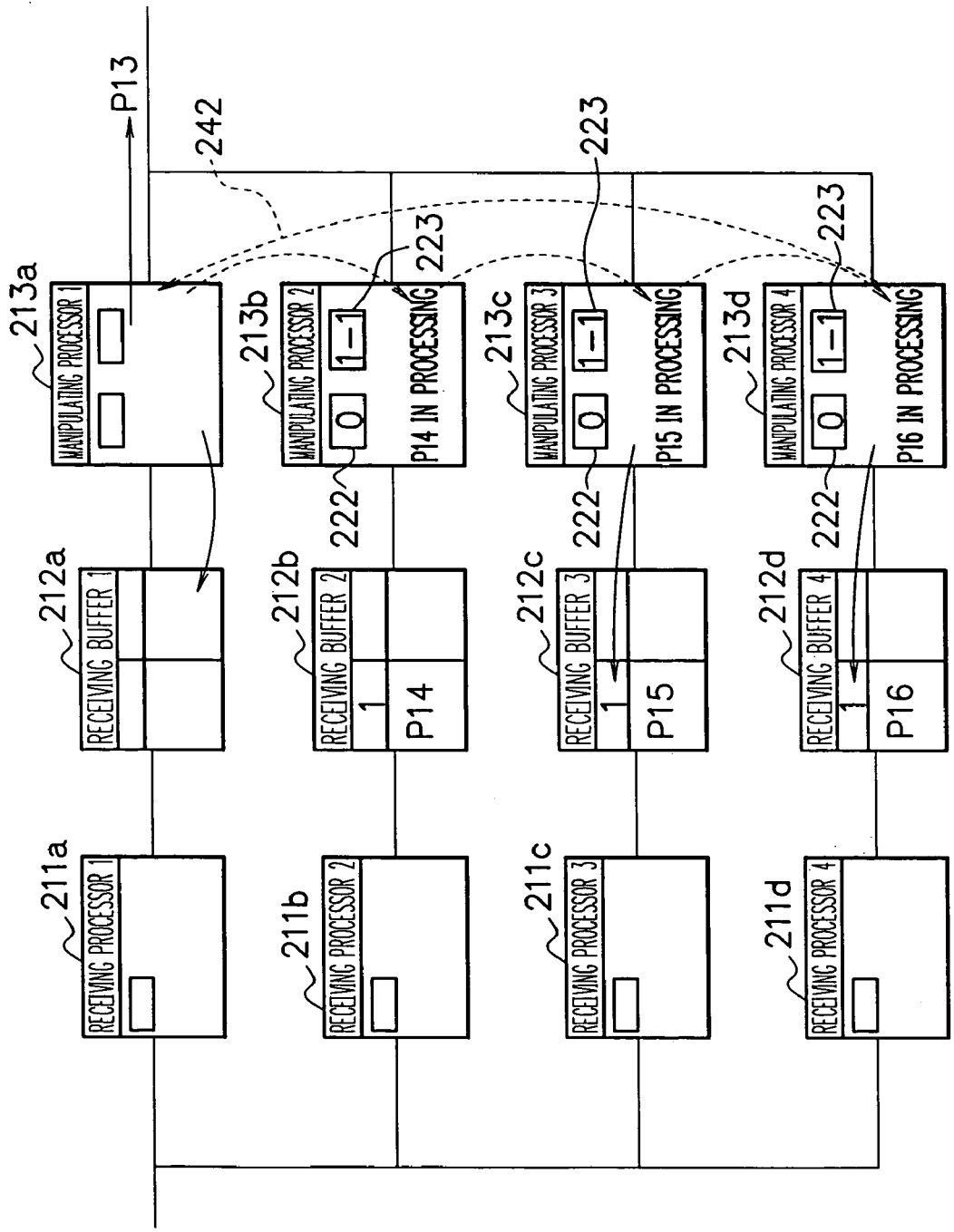
FIG. 7 is a diagram showing the first processing example of the input processor.

Next, as shown in FIG. 7, the second manipulating processor 213b has the transmission token 242 but the value of the discarded packet counter 233 is "1", which is greater than the value "0" of the idle counter 222, therefore, the second manipulating processor 213b decrements the discarded packet counter 223 (−1) without packet transmission and passes the transmission token 242 to the third manipulating processor 213c. Next, similarly, the third and fourth manipulating processors 213c and 213d respectively decrement the discarded packet counter 223 without packet transmission and passes the transmission token 242 to the next manipulating processors 213. Next, the first manipulating processor 213a transmits the packet P13 and passes the transmission token 242 to the second manipulating processor 213b.

Figure 8:
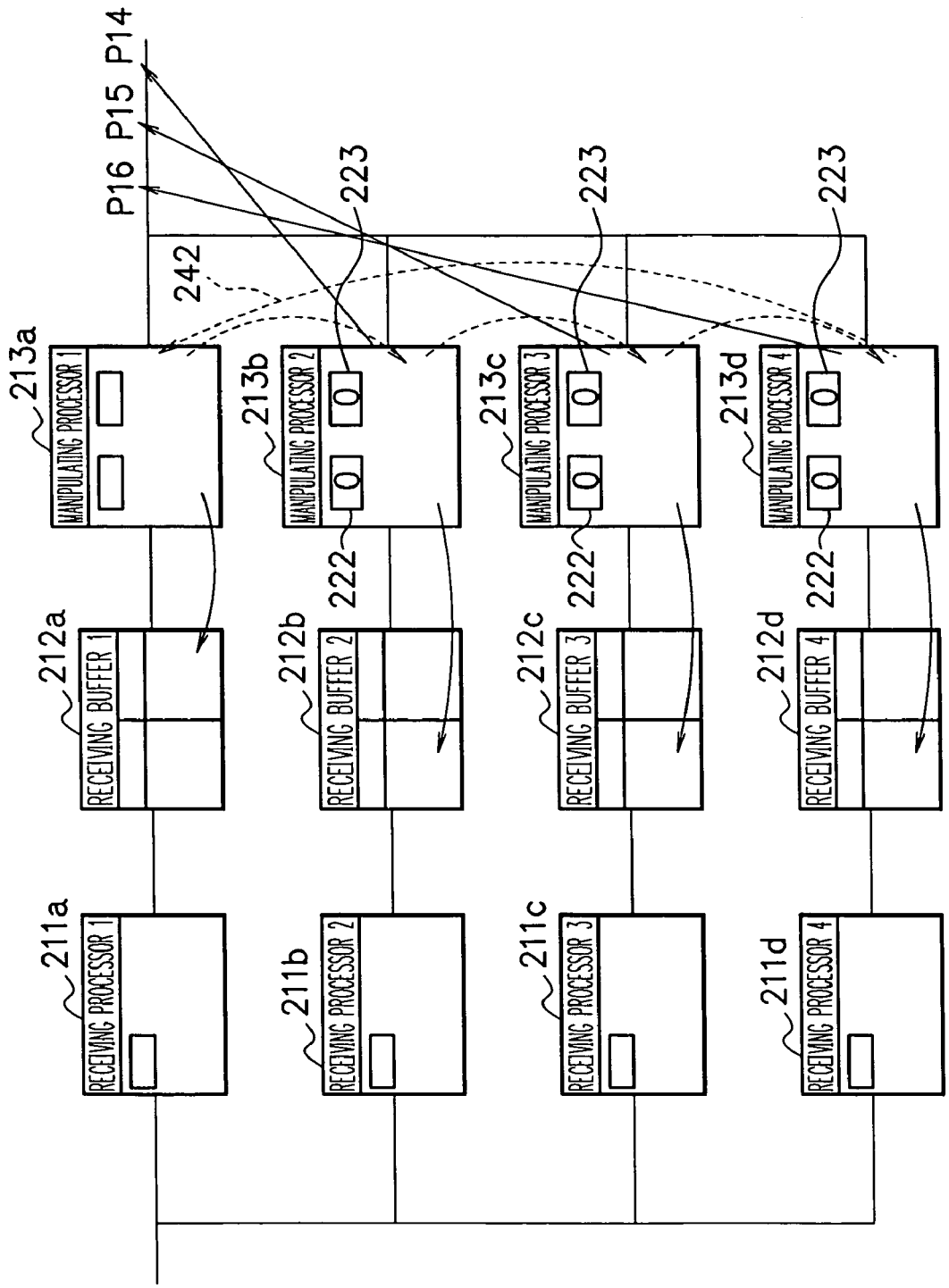
FIG. 8 is a diagram showing the first processing example of the input processor.

Next, as shown in FIG. 8, since the value of the discarded packet counter 223 is "0" and the value of the idle counter 222 is less than or equal to "0", the second manipulating processor 213b transmits the packet P14 and releases the packet P14 in the second receiving buffer 212b. Similarly, since the value of the discarded packet counter 223 is "0" and the value of the idle counter 222 is less than or equal to "0", the third and fourth manipulating processor 213c and 213d transmit the packets P15 and P16 and release the packets P15 and P16 in the receiving buffers 212c and 212d.

As described above, it becomes possible for the manipulating processor 213 to learn how many packets have been discarded before the reception of the current packet if the receiving processor 211 increments the discarded packet counter 221 when a packet is discarded and stores the value of the discarded packet counter at the same time when storing a received packet in the receiving buffer 212 next time.

In a situation in which no packet is discarded, the order is never reversed as long as the order of packets is matched by a token. It becomes possible to prevent the order from being reversed by taking into account the fact that discarded packets are those which should have been processed by the relevant manipulating processor and therefore circulating the transmission token idly the number of times corresponding to that of the discarded packets to handle the discarded packets as those which have been processed or transmitted.

In the case described above, the idle counter 222 is not necessarily required. Upon receipt of the transmission token 242, the manipulating processor 213 transmits the packet in the receiving buffer 212 when the value of the discarded packet counter is zero, or decrements the discarded packet counter without transmission when the value of the discarded packet counter 223 is equal to or greater than one, and passes the transmission token to the next manipulating processor 213.

Figure 9:
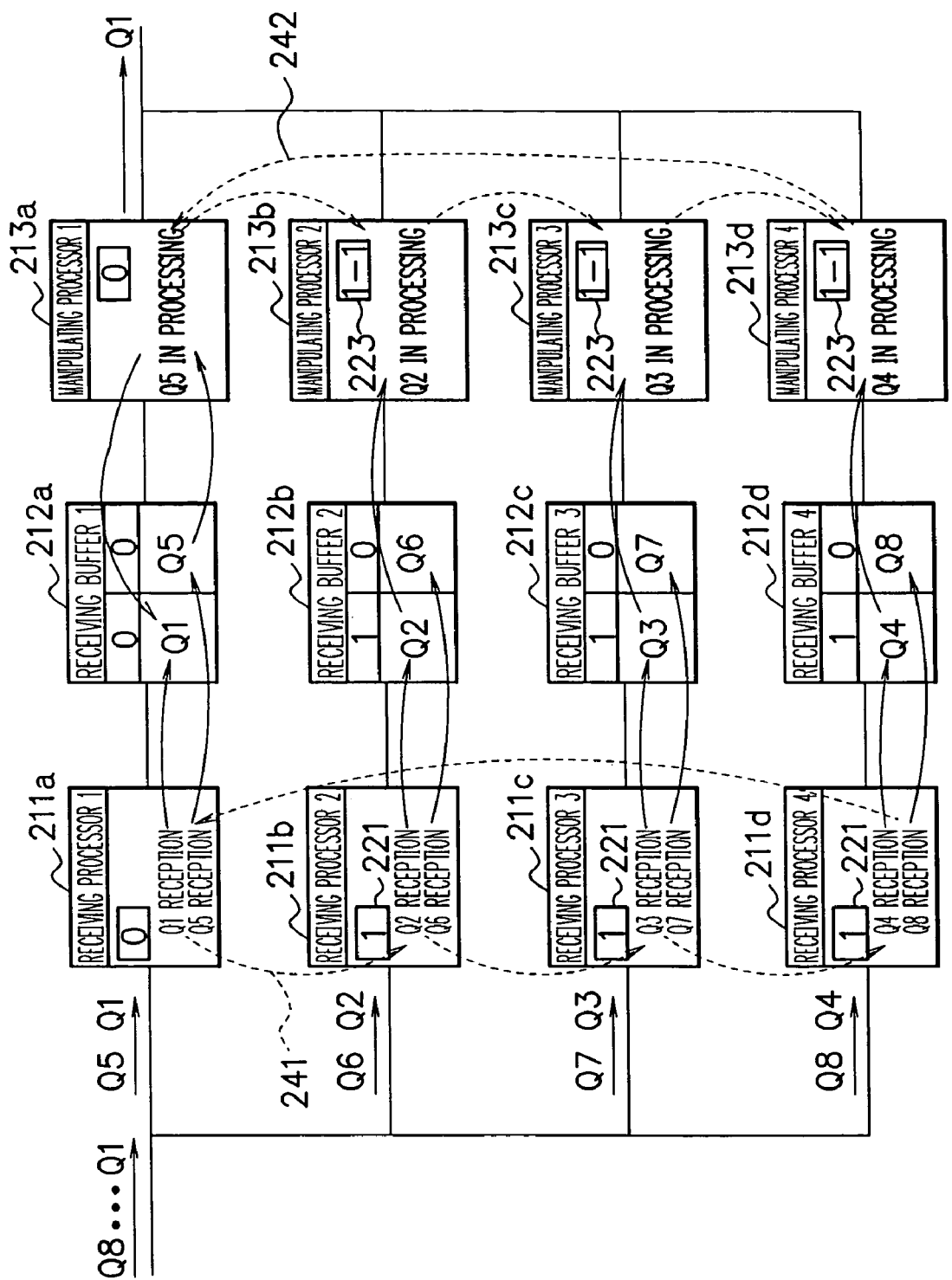
FIG. 9 is a diagram showing a second processing example of an input processor.
Figure 10:
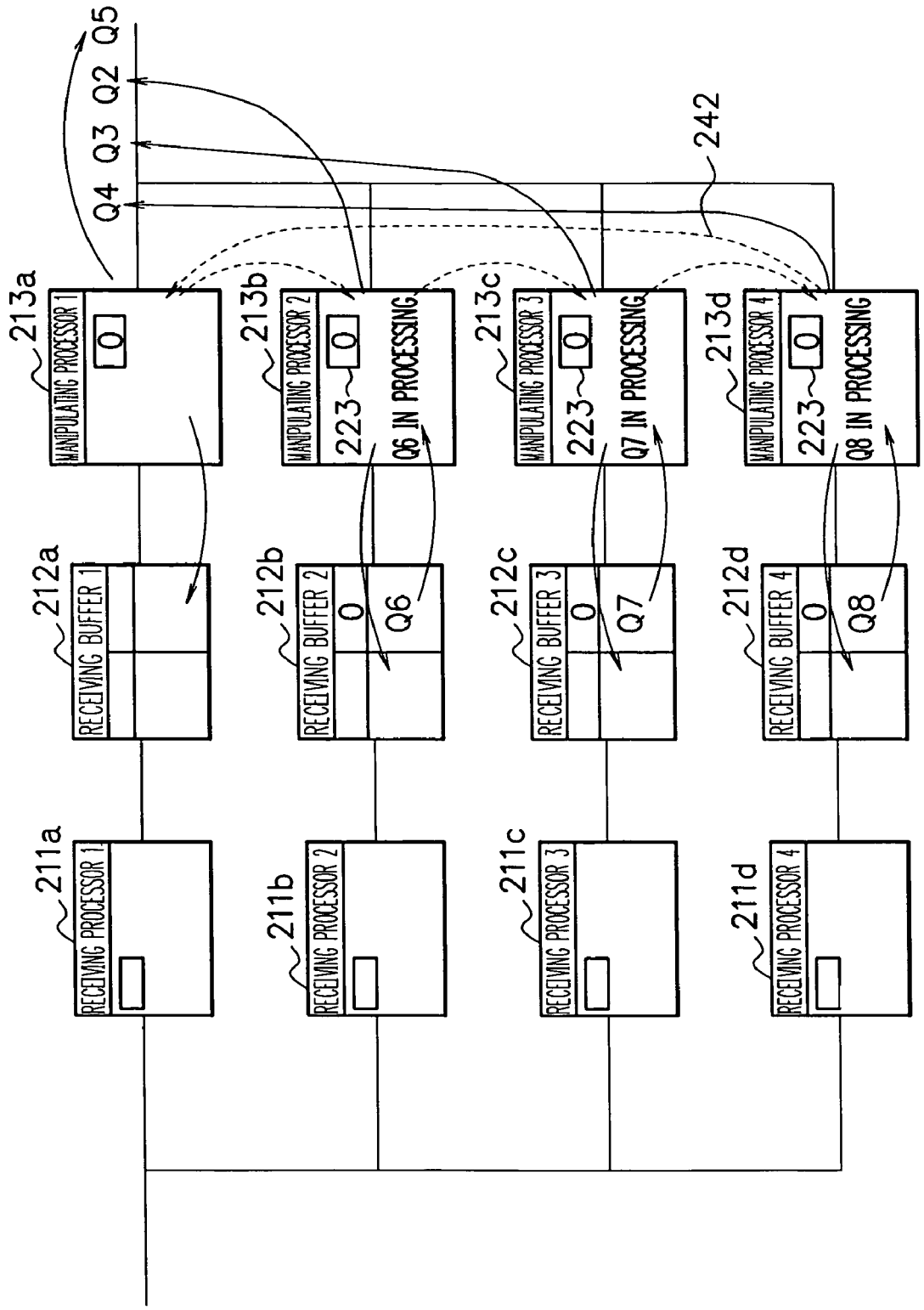
FIG. 10 is a diagram showing the second processing example of the input processor.

Next, the problem when the idle counter 222 is not provided is explained by referring to FIG. 9 and FIG. 10. A case where an idle state is brought about after the processing shown in FIG. 3 and FIG. 4 is explained. Here, the idle state means a state in which no packet is inputted after the above-mentioned packets P1 to P8 are inputted. Specifically, the idle state means a state in which the receiving buffer 212 is empty when the manipulating processor 213 receives the transmission token 242.

As shown in FIG. 9, when packets Q1 to Q8 are inputted successively after the above-mentioned idle state, the first receiving processor 211a having the reception token 241 receives the packet Q1, stores the packet in the first receiving buffer 212a, and passes the reception token 241 to the second receiving processor 211b. Similarly, the second to fourth receiving processors 211b to 211d receive the packets Q2 to Q4, respectively, and store the value "1" of the discarded packet counter 221 of the second to fourth receiving processors 211b to 211d in the receiving buffers 212b to 212d as well as storing the packets Q2 to Q4 in the receiving buffers 212b to 212d. After this, the discarded packet counter 221 is reset to zero. Next, the first to fourth receiving processors 211a to 211d receive the packets Q5 to Q8, respectively, and store the packets in the receiving buffers 212a to 212d.

The first receiving buffer 212a stores the packets Q1 and Q5, the second receiving buffer 212b stores the packets Q2 and Q6, the third receiving buffer 212c stores the packets Q3 and Q7, and the fourth receiving buffer 212d stores the packets Q4 and Q8. The first manipulating processor 213a performs processing to the packet Q1 in the first receiving buffer 212a. Next, the second manipulating processor 213b performs processing to the packet Q2 in the second receiving buffer 212b and at the same time, sets the value "1" of the discarded packet counter in the corresponding receiving buffer 212b to the discarded packet counter 223. Next, similarly, the third and fourth manipulating processors 213c and 213d perform processing to the packets Q3 and Q4 in the receiving buffers 212c and 212d and at the same time, set the value "1" of the discarded packet counter in the corresponding receiving buffers 212c and 212d to the discarded packet counters 223.

Next, the first manipulating processor 213a transmits the packet Q1, releases the packet Q1 in the receiving buffer 212a, and performs processing to the next packet Q5 in the receiving buffer 212a. Next, since the value of the discarded packet counter 223 is "1", the second manipulating processor 213b decrements the discarded packet counter 223 without packet transmission and passes the transmission token 242 to the third manipulating processor 213c. Next, similarly, since the value of the discarded packet counter 223 is "1", the third and fourth manipulating processors 213c and 213d decrement the discarded packet counter 223 without packet transmission and pass the transmission token 242 to the next one. The value of the discarded packet counter 223 in the second to fourth manipulating processors 213b to 213d becomes "0".

Next, as shown in FIG. 10, the first manipulating processor 213a transmits the packet Q5 and releases the packet Q5 in the receiving buffer 212a. Next, the second manipulating processor 213b transmits the packet Q2 and releases the packet Q2 in the receiving buffer 212b. After this, the second manipulating processor 213b performs processing to the packet Q6 in the receiving buffer 212b. Similarly, the third and fourth manipulating processors 213c and 213d transmit the packets Q3 and Q4, respectively, and then perform processing to the packets Q7 and Q8.

As described above, in the case where the last packets P10 to P12 of the successive packets have been discarded (when the packet input is completed in a state shown in FIG. 4), the value "1" of the discarded packet counter 223 has been attached to the first packets Q2 to Q4 to be passed to the next manipulating processor 213, therefore, the order of the packets is reversed even if the idle state is in between. In other words, the order of the packets is Q5→Q2→Q3→Q4. Such a problem can be resolved by the use of the above-mentioned idle counter 222. This is explained below.

Figure 11:
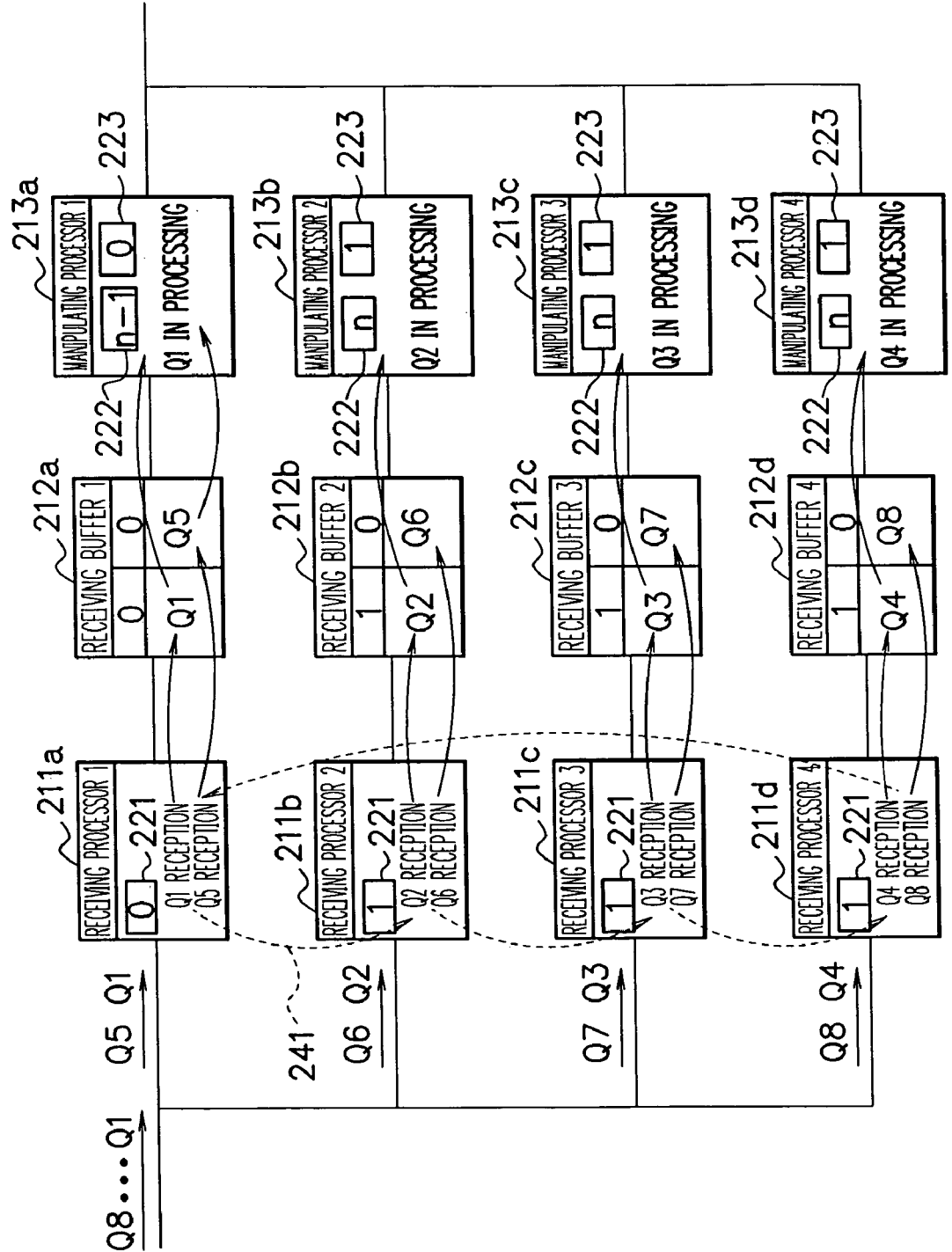
FIG. 11 is a diagram showing a third processing example of an input processor.

Similar to the above, a case where an idle state is brought about after the processing in FIG. 3 and FIG. 4 is explained. As shown in FIG. 11, upon the receipt of the transmission token, the manipulating processor 213 increments the idle counter 222 and passes the transmission token to the next manipulating processor 213 regarding that the state is an idle state when the receiving buffer 212 is empty. Due to this processing, the value "n", for example, is set to the idle counter 222 of the manipulating processors 213a to 213d. For example, "n" is one or greater.

Next, when the packets Q1 to Q8 are inputted successively, the first receiving processor 211a having the reception token 241 receives the packet Q1, stores the packet in the receiving buffer 212a, and passes the reception token 241 to the second receiving processor 211b. Similarly, the second to fourth receiving processors 211b to 211d receive the packets Q2 to Q4, respectively, and store the value "1" of the discarded packet counter 221 in the receiving buffers 212b to 212d as well as storing the packets in the buffers 212b to 212d. After this, the discarded packet counter 221 is reset to "0". Next, the first to fourth receiving processors 211a to 211d receive the packets Q5 to Q8, respectively, and store the packets in the receiving buffers 212a to 212d.

The first receiving buffer 212a stores the packets Q1 and Q5, the second receiving buffer 212b stores the packets Q2 and Q5, the third receiving buffer 212c stores the packets Q3 and Q7, and the fourth receiving buffer 212d stores the packets Q4 and Q8. The first manipulating processor 213a performs processing to the packet Q1 in the first receiving buffer 212a. Next, the second manipulating processor 213b performs processing to the packet Q2 in the second receiving buffer 212b and at the same time, sets the value "1" of the discarded packet counter in the corresponding receiving buffer 212b to the discarded packet counter 223. Next, similarly, the third and fourth manipulating processors 213c and 213d perform processing to the packets Q3 and Q4 in the receiving buffers 212c and 212d and at the same time, set the value "1" of the discarded packet counter in the corresponding receiving buffers 212c and 212d to the discarded packet counters 223.

Figure 12:
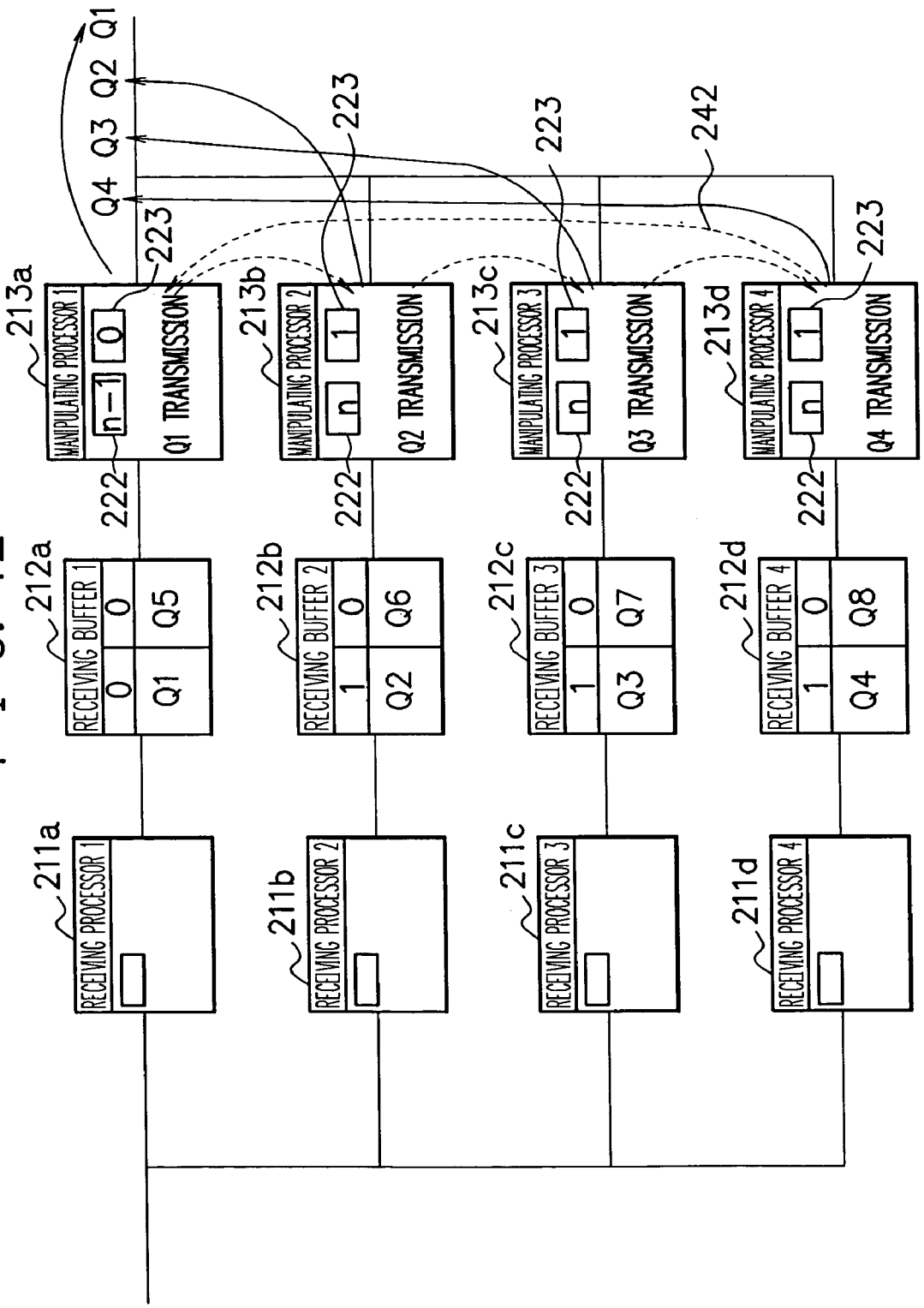
FIG. 12 is a diagram showing the third processing example of the input processor.

Next, as shown in FIG. 12, the first manipulating processor 213b transmits the packet Q1. Next, since the value "1" of the discarded packet counter 223 is less than or equal to the value "n" of the idle counter 222, the second manipulating processor 213b transmits the packet Q2 and passes the transmission token 242 to the third manipulating processor 213c. Next, similarly, since the value "1" of the discarded packet counter 223 is less than or equal to the value "n" of the idle counter 222, the third and fourth manipulating processors 213c and 213d transmit the packets Q3 and Q4 and pass the transmission toke to the next one.

Figure 13:
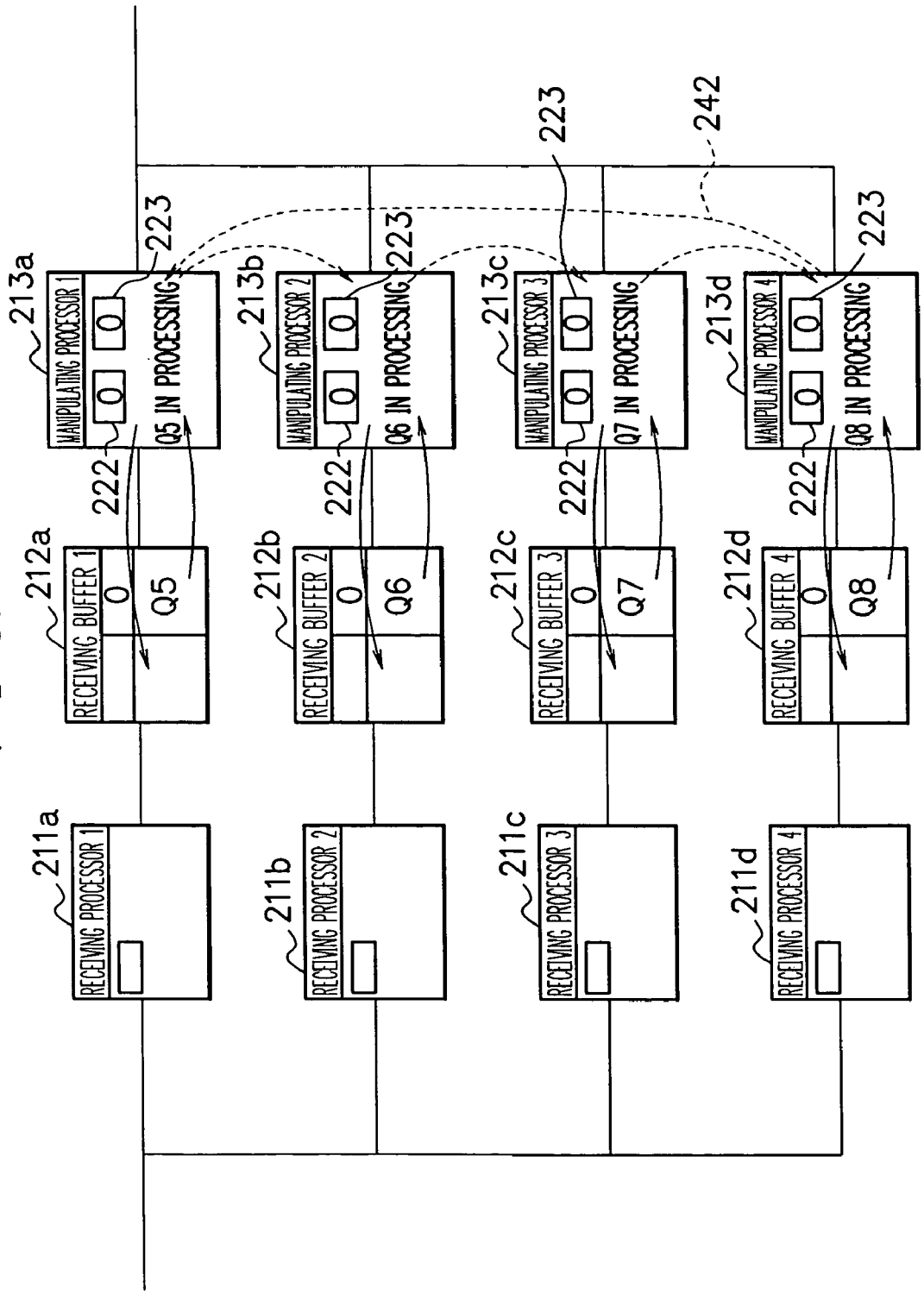
FIG. 13 is a diagram showing the third processing example of the input processor.
Figure 15:
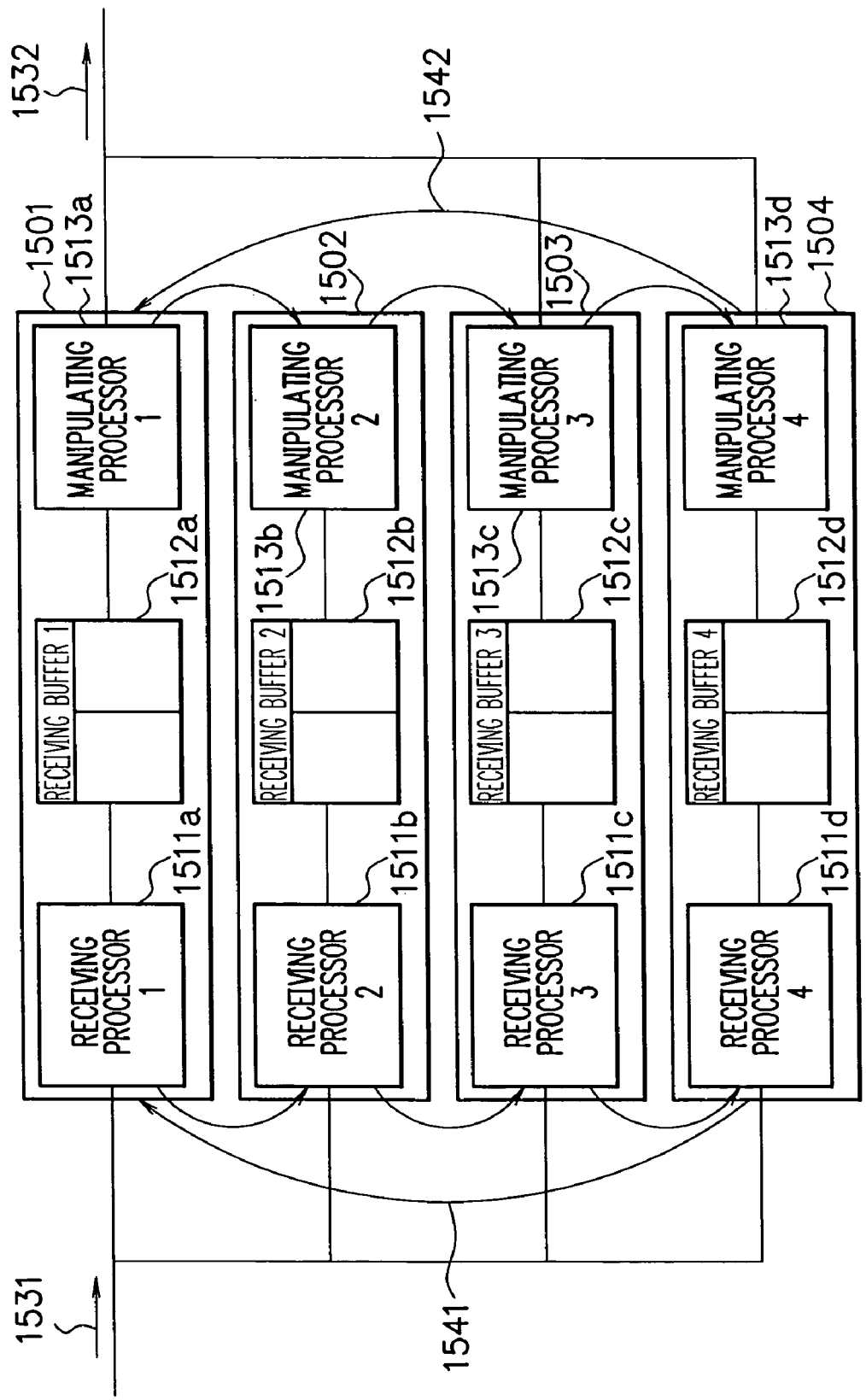
FIG. 15 is a diagram showing a configuration of an input processor according to a conventional technique.
Figure 16:
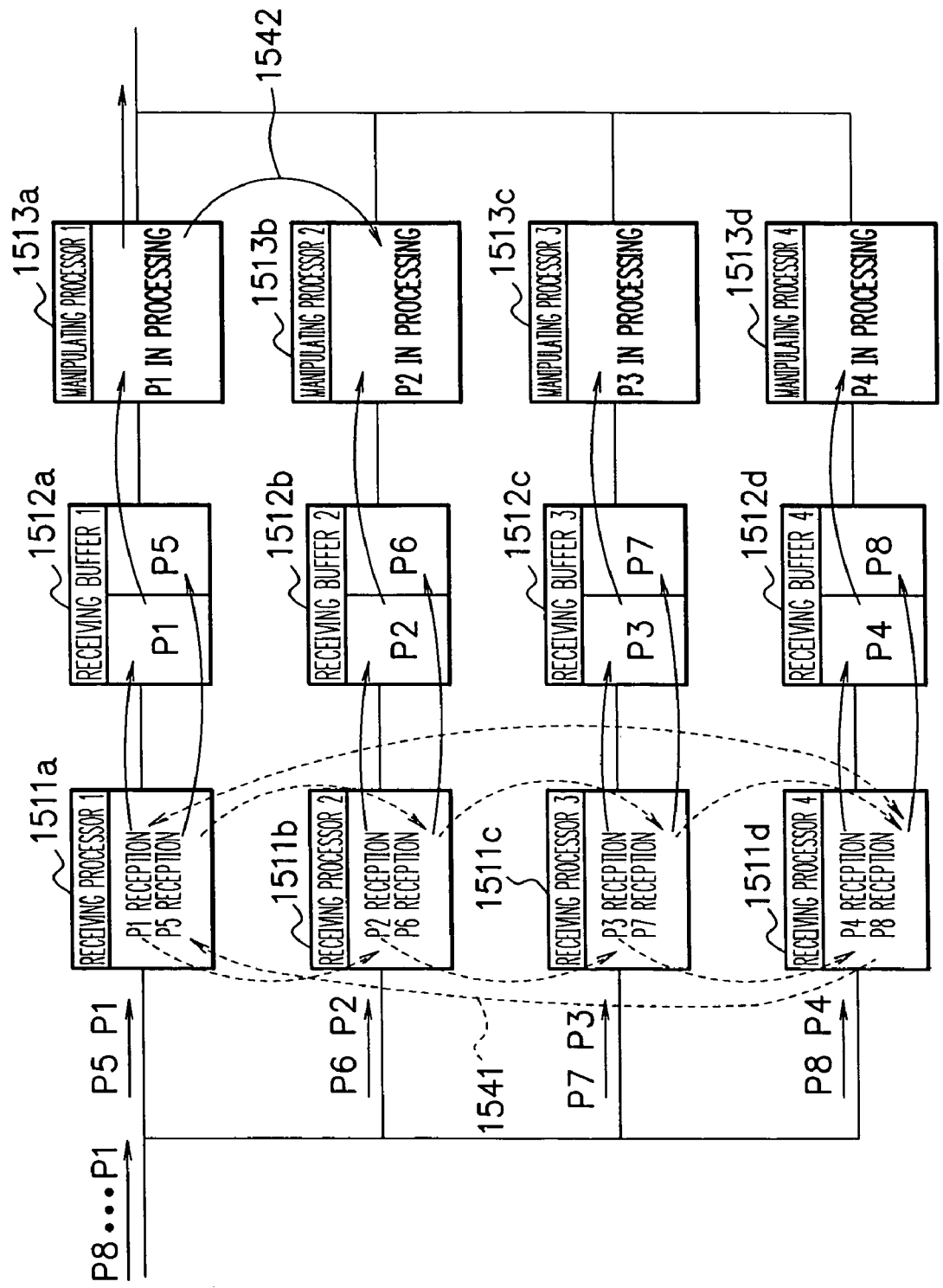
FIG. 16 is a diagram showing a processing example of the input processor according to the conventional technique.
Figure 17:
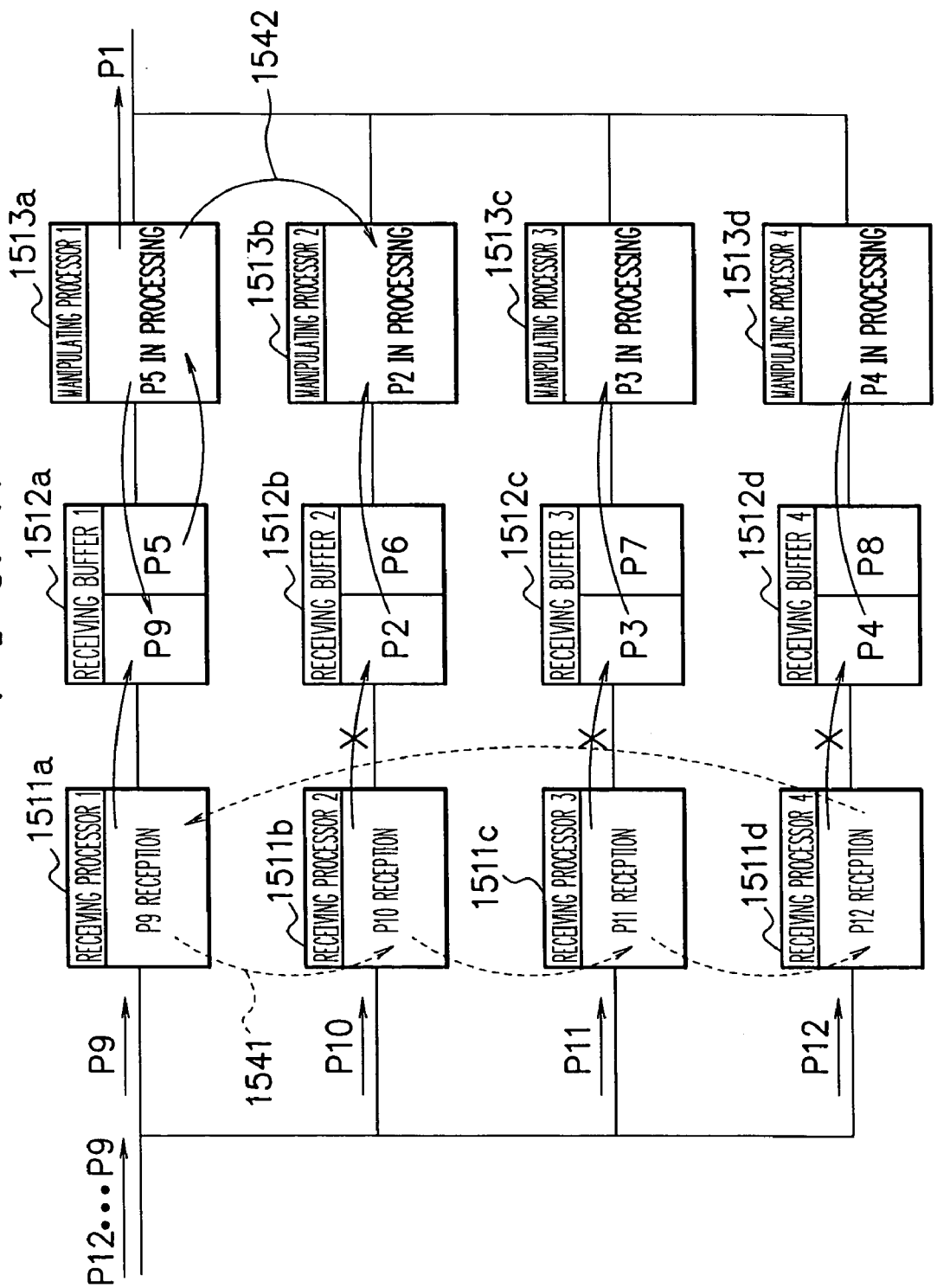
FIG. 17 is a diagram showing the processing example of the input processor according to the conventional technique.

Next, as shown in FIG. 13, after the above-mentioned transmission, the first to fourth manipulating processors 213a to 213d reset the idle counter 222 and the discarded packet counter 223 to "0". After this, the first manipulating processor 213a releases the packet Q1 in the receiving buffer 212a and performs processing to the packet Q5. The second manipulating processor 213b releases the packet Q2 in the receiving buffer 212b and performs processing to the packet Q6. The third and fourth manipulating processors 213c and 213d release the packets Q3 and Q4 in the receiving buffers 212c and 212d and perform processing to the packets Q7 and Q8. After this, the packets Q5, Q6, Q7, and Q8 are transmitted in order.

As described above, upon receipt of the transmission token, the manipulating processor 213 increments the idle counter 222 when there is no packet in the receiving buffer 212 and passes the transmission token to another manipulating processor 213. When there is a packet in the receiving buffer 212, the manipulating processor 213 transmits the packet in the receiving buffer 212 if the value of the discarded packet counter 223 is equal to or less than that of the idle counter 222 and resets the idle counter 222. When the value of the discarded packet counter 223 is greater than that of the idle counter 222, the manipulating processor 213 decrements the discarded packet counter 223 without transmitting the packet in the receiving buffer 212 and passes the transmission token to another manipulating processor 213. Due to this, when an idle state is brought about after the last packets P10 to P12 of the successive packets have been discarded, even if the packets Q1 to Q8 are inputted, the packets can be transmitted in proper order.

FIG. 14 is a flowchart showing the processing procedure of the above-mentioned input processor (communication device) 101 according to the embodiment of the present invention. In step S1401, whether a packet is received is checked. Specifically, the manipulating processor checks whether there is a packet in the receiving buffer. If there is a packet in the receiving buffer, the procedure advances to step S1405 and if not, advances to step S1402. The receiving processor stores the packet in the receiving buffer if the receiving buffer is empty, or discards the packets if not.

In step S1402, whether the manipulating processor has the transmission token is checked. If not, the procedure returns to step S1401 and if the manipulating processor has the transmission token, the procedure advances to step S1403. In step S1403, the transmission token is released and passed to the next manipulating processor. Next, in step S1404, the idle counter is incremented. After this, the procedure returns to step S1401.

In step S1405, processing is performed to the received packet. In other words, the transmitting processor performs processing to the packet in the receiving buffer. For example, the address analysis of the packet is performed and the destination is determined. Next, in step S1406, whether the manipulating processor has the transmission token is checked. If not, a standby mode is entered and if the manipulating processor has the transmission token, the procedure advances to step S1407.

In step S1407, the condition, that is, whether the value of the discarded packet counter is equal to or less than that of the idle counter is checked. If the condition is not met, the procedure advances to step S1408 and if met, advances to step S1410.

In step S1408, the transmission token is released and is passed to the next manipulating processor. Next, in step S1409, the discarded packet counter is decremented. After this, the procedure returns to step S1406.

In step S1410, the manipulating processor performs the packet transmission processing. Next, in step S1411, the transmission token is released and is passed to the next manipulating processor. Next, in step S1412, the idle counter is reset to zero. The processing is completed as above. Such processing is performed repeatedly.

In the present embodiment, fast packet processing is performed using a token in a multi-processor system (network processor or the like). As described above, upon receipt of the reception token, the receiving processor buffers the packet in the receiving buffer when the receiving buffer is empty. When the receiving buffer is not empty, the receiving processor discards the received packet, increments the number of discarded packets, and passes the reception token to another receiving processor. The manipulating processor transmits the packets in order of reception of the above-mentioned packets to the outside based on the number of counted discarded packets.

Upon receipt of the transmission token, the manipulating processor increments the number of idles when there is no packet in the receiving buffer and passes the transmission token to another manipulating processor. When there is a packet in the receiving buffer, the manipulating processor transmits the packet in the receiving buffer in accordance with the number of discarded packets and the number of idles.

According to the present embodiment, it is possible to prevent the order of packets from being reversed even in a situation in which such a reversal of the order can be caused due to the discard of packets in a multi-processor system such as a network processor using a token and the influence on the processing performance can be kept to a minimum because there is no need to take into account the state or the like of other processors and this can be realized with addition of a small amount of algorithms.

It is also possible for software in an upper layer to request re-transmission of discarded packets for recovery. The present embodiment is not limited to the number of processors described above and can be realized also in various multi-processor systems operated by token control.

The embodiments described above are only for illustrative examples of embodiments of the present invention and the technical scope of the present invention should not be limitedly construed. In other words, it is possible to realize various deformations of the present invention without departing from the technical concept and the main features of the present invention.

INDUSTRIAL APPLICABILITY

According to the present embodiment, it is possible to prevent the order of packet transmission from being reversed even when received packets are discarded in a congestion state if each processor unit counts the number of discarded packets and transmits packets based on the number of discarded packets. Moreover, it is also possible to prevent the order of packet transmission from being reversed with a simple configuration without taking into account the state or the like of other processor units and the influence on the processing performance of a communication device can be kept to a minimum.

What is claimed is:

1. A communication device having a plurality of processor units, each processor unit comprising:
   a buffer for buffering a packet;
   a receiving processor for, upon receipt of a reception token, receiving a packet from the outside, buffering the received packet in said buffer, and passing the reception token to another processor unit for circulation; and
   a transmitting processor for, upon receipt of a transmission token, transmitting the packet in said buffer to the outside and passing the transmission token to another processor unit for circulation, wherein:
      said receiving processor, upon receipt of the reception token, buffers the received packet in said buffer when said buffer is empty, or discards the received packet when said buffer is not empty, increments a number of discarded packets, and passes the reception token to another processor unit, and
      said transmitting processor transmits the packets in said order of reception of packets based on said number of discarded packets,
   wherein said transmitting processor, upon receipt of the transmission token, increments the number of idles when there is no packet in said buffer and passes the transmission token to another processor unit, or transmits the packet in said buffer in accordance with said number of discarded packets and said number of idles when there is a packet in said buffer, and
   wherein said transmitting processor transmits the packet in said buffer and resets said number of idles when said number of discarded packets is equal to or less than said number of idles.

2. The communication device according to claim 1, wherein said transmitting processor decrements said number of discarded packets without transmitting the packet in said buffer when said number of discarded packets is greater than said number of idles, and passes the transmission token to another processor unit.

3. The communication device according to claim 2, wherein said receiving processor receives a packet having a media access control (MAC) frame.

4. The communication device according to claim 3, wherein said transmitting processor further analyzes the address of the packet in said buffer.

5. The communication device according to claim 4, further comprising an output device to receive a packet transmitted from said plurality of processor units and outputting said received packet in accordance with said analyzed address.

6. A communication method using a plurality of processor units, comprising:
   with each processor unit, receiving a packet from the outside upon receipt of a reception token, buffering the received packet in a buffer, and passing the reception token to another processor unit for circulation; and
   with each processor unit, transmitting the packet in the buffer to the outside upon receipt of a transmission token and passing the transmission token to another processor unit for circulation, wherein:

in said receiving a packet, upon receipt of the reception token, the received packet is buffered in the buffer when the buffer is empty, or the received packet is discarded and a number of discarded packets is incremented when the buffer is not empty, and the reception token is passed to another processor unit, and in said transmitting the packet, the packets are transmitted to the outside in the order of reception of packets based on said number of discarded packets wherein in said transmitting the packet, upon receipt of the transmission token, the number of idles is incremented and the transmission token is passed to another processor unit when there is no packet in the buffer, or the packet in the buffer is transmitted in accordance with said number of discarded packets and said number of idles when there is a packet in the buffer, and wherein in said transmitting the packet, the packet in the buffer is transmitted when said number of discarded packets is equal to or less than said number of idles, and said number of idles is reset.

7. The communication method according to claim 6, wherein in said transmitting the packet, the packet in the buffer is not transmitted and said number of discarded packets is decremented when said number of discarded packets is greater than said number of idles, and the transmission token is passed to another processor unit.

8. The communication method according to claim 7, wherein in said receiving a packet, a packet having a media access control (MAC) frame is received.

9. The communication method according to claim 8, wherein said transmitting the packet further comprises analyzing the address of the packet in the buffer.

10. The communication method according to claim 9, further comprising receiving the packet transmitted from said plurality of processor units and outputting said received packet in accordance with said analyzed address.

* * * * *

UNITED STATES PATENT AND TRADEMARK OFFICE
CERTIFICATE OF CORRECTION

PATENT NO. : 7,796,618 B2
APPLICATION NO. : 11/234111
DATED : September 14, 2010
INVENTOR(S) : Katsuhiko Yamatsu et al.

It is certified that error appears in the above-identified patent and that said Letters Patent is hereby corrected as shown below:

Column 13, line 10 (Approx.), in claim 6, after "packets" insert -- , --.

Signed and Sealed this
Twenty-eighth Day of December, 2010

David J. Kappos
*Director of the United States Patent and Trademark Office*